US009881381B2

(12) United States Patent
Kono et al.

(10) Patent No.: US 9,881,381 B2
(45) Date of Patent: Jan. 30, 2018

(54) IMAGE PROCESSING APPARATUS, IMAGE PROCESSING METHOD, AND COMPUTER-READABLE RECORDING MEDIUM

(71) Applicant: OLYMPUS CORPORATION, Tokyo (JP)

(72) Inventors: Takashi Kono, Tachikawa (JP); Yamato Kanda, Hino (JP); Makoto Kitamura, Hachioji (JP); Toshiya Kamiyama, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 30 days.

(21) Appl. No.: 15/183,975

(22) Filed: Jun. 16, 2016

(65) Prior Publication Data
US 2016/0292875 A1    Oct. 6, 2016

Related U.S. Application Data

(63) Continuation of application No. PCT/JP2013/084137, filed on Dec. 19, 2013.

(51) Int. Cl.
*G06K 9/46* (2006.01)
*G06T 7/00* (2017.01)
(Continued)

(52) U.S. Cl.
CPC .......... *G06T 7/0081* (2013.01); *G06T 7/0012* (2013.01); *G06T 7/11* (2017.01);
(Continued)

(58) Field of Classification Search
CPC . G06T 2207/10068; G06T 2207/30028; G06T 7/0012; G06T 7/0081; G06T 7/11; G06T 7/64
See application file for complete search history.

(56) References Cited

U.S. PATENT DOCUMENTS 7,747,055 B1 *   6/2010   Vining ................... A61B 6/466
                                                     345/419
9,721,341 B2 *   8/2017   Kang .................... G06T 7/0012
(Continued)

FOREIGN PATENT DOCUMENTS

EP    2 057 932 A1    5/2009
JP    S62-159292 A    7/1987
(Continued)

OTHER PUBLICATIONS

International Search Report dated Apr. 1, 2014 issued in PCT/JP2013/084137.
(Continued)

*Primary Examiner* — Phuoc Tran
(74) *Attorney, Agent, or Firm* — Scully, Scott, Murphy & Presser, P.C.

(57) ABSTRACT

An image processing apparatus includes: a region-of-interest setting unit configured to set a region of interest in an image; a linear convex region extracting unit configured to extract, from the region of interest, a linear region having a predetermined number or more of continuously-arranged pixels whose pixel values are higher than pixel values of neighboring pixels; an intra-region curvature feature data computing unit configured to compute curvature feature data based on curvatures of one or more arcs along the linear region; and an abnormality determining unit configured to determine whether there is an abnormal portion in the region of interest, based on a distribution of the curvature feature data.

9 Claims, 31 Drawing Sheets

(51) Int. Cl.
G06T 7/11 (2017.01)
G06T 7/64 (2017.01)

(52) U.S. Cl.
CPC ...... *G06T 7/64* (2017.01); *G06T 2207/10068* (2013.01); *G06T 2207/30028* (2013.01)

(56) References Cited

U.S. PATENT DOCUMENTS

| | | | |
|---|---|---|---|
| 2004/0064029 | A1 | 4/2004 | Summers et al. |
| 2005/0053270 | A1 | 3/2005 | Kasai et al. |
| 2012/0070049 | A1* | 3/2012 | Iwase .................... G06T 7/0012 382/128 |
| 2012/0076419 | A1 | 3/2012 | Kono et al. |

FOREIGN PATENT DOCUMENTS

| | | |
|---|---|---|
| JP | 2006-166990 A | 6/2006 |
| JP | 2007-236956 A | 9/2007 |
| JP | 2008-278963 A | 11/2008 |
| JP | 2012-073953 A | 4/2012 |
| JP | 2014-023566 A | 2/2014 |
| WO | WO 2006/080239 A1 | 8/2006 |

OTHER PUBLICATIONS

Japanese Office Action dated Jun. 7, 2016 in related Japanese Patent Application No. 2012-163902.

Japanese Office Action dated Mar. 21, 2017 in Japanese Patent Application No. 2012-163902.

Gadermayr, G. et al., "Shape Curvature Histogram: A Shape Feature for Celiac Disease Diagnosis", Medical Computer Vision. Large Data in Medical Imaging. 3rd International MICCAI Workshop, MCV 2013, Revised Selected Papers, Sep. 23, 2013, pp. 175-184, cited in EPSR.

Extended Supplementary European Search Report dated Jul. 13, 2017 in European Patent Application No. 13 89 9537.8.

* cited by examiner

NORMAL VILLUS MODEL

| * | * | 0 |
|---|---|---|
| * | * | 0 |
| 0 | 0 | 0 |

M11

| 1 | * | * |
|---|---|---|
| 1 | * | * |
| 1 | 1 | 1 |

M12

| 1 | 1 | 1 |
|---|---|---|
| 1 | * | * |
| 1 | * | * |

M13

| 1 | 1 | 1 |
|---|---|---|
| * | * | 1 |
| * | * | 1 |

| 1 | 1 | 0 |
|---|---|---|
| 1 | 1 | 0 |
| 0 | 0 | 0 |

M21

| 0 | 1 | 1 |
|---|---|---|
| 0 | 1 | 1 |
| 0 | 0 | 0 |

M22

| 0 | 0 | 0 |
|---|---|---|
| 0 | 1 | 1 |
| 0 | 1 | 1 |

M23

| 0 | 0 | 0 |
|---|---|---|
| 1 | 1 | 0 |
| 1 | 1 | 0 |

M24

FREQUENCY OF CURVATURE CENTRAL
DIRECTION FOR EACH GRADIENT DIRECTION
(ABNORMAL VILLI)

FREQUENCY OF CURVATURE CENTRAL
DIRECTION FOR EACH GRADIENT DIRECTION
(BUBBLE REGION)

IMAGE PROCESSING APPARATUS, IMAGE PROCESSING METHOD, AND COMPUTER-READABLE RECORDING MEDIUM

CROSS-REFERENCE TO RELATED APPLICATIONS

This application is a continuation of PCT international application Ser. No. PCT/JP2013/084137 filed on Dec. 19, 2013 which designates the United States, incorporated herein by reference.

BACKGROUND

1. Technical Field

The disclosure relates to an image processing apparatus, an image processing method, and a computer-readable recording medium for determining whether there is an abnormal portion in an image obtained by imaging an in-vivo lumen.

2. Related Art

For image processing performed on an intraluminal image (hereinafter, also simply referred to an image) which is acquired by observing the mucosa of the large intestine with a magnification endoscope, for example, Japanese Laid-open Patent Publication No. 2007-236956 discloses a technique for classifying a pit pattern of a mucosal surface (called a large intestine pit pattern) into a plurality of types. Specifically, Gabor filters with m frequencies and k phase orientations are applied to each pixel in a region of interest which is set in an image, by which m×k-dimensional feature vectors are computed, and the mean or variance of the feature vectors is computed. Then, a large intestine pit pattern is classified based on the mean or variance of the feature vectors, and it is determined whether the large intestine pit pattern is abnormal.

SUMMARY

In some embodiments, an image processing apparatus includes: a region-of-interest setting unit configured to set a region of interest in an image; a linear convex region extracting unit configured to extract, from the region of interest, a linear region having a predetermined number or more of continuously-arranged pixels whose pixel values are higher than pixel values of neighboring pixels; an intra-region curvature feature data computing unit configured to compute curvature feature data based on curvatures of one or more arcs along the linear region; and an abnormality determining unit configured to determine whether there is an abnormal portion in the region of interest, based on a distribution of the curvature feature data.

In some embodiments, an image processing method includes: setting a region of interest in an image; extracting, from the region of interest, a linear region having a predetermined number or more of continuously-arranged pixels whose pixel values are higher than pixel values of neighboring pixels; computing curvature feature data based on curvatures of one or more arcs along the linear region; and determining whether there is an abnormal portion in the region of interest, based on a distribution of the curvature feature data.

In some embodiments, a non-transitory computer-readable recording medium with an executable program stored thereon is provided. The program instructs a processor to execute: setting a region of interest in an image; extracting, from the region of interest, a linear region having a predetermined number or more of continuously-arranged pixels whose pixel values are higher than pixel values of neighboring pixels; computing curvature feature data based on curvatures of one or more arcs along the linear region; and determining whether there is an abnormal portion in the region of interest, based on a distribution of the curvature feature data.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 22 is a schematic diagram illustrating patterns used in a Hilditch thinning algorithm;

FIG. 23 is a schematic diagram illustrating patterns used in the Hilditch thinning algorithm;

DETAILED DESCRIPTION

Image processing apparatuses, image processing methods, and image processing programs according to some embodiments of the present invention will be described below with reference to the drawings. The present invention is not limited to these embodiments. The same reference signs are used to designate the same elements throughout the drawings.

First Embodiment

Figure 1:
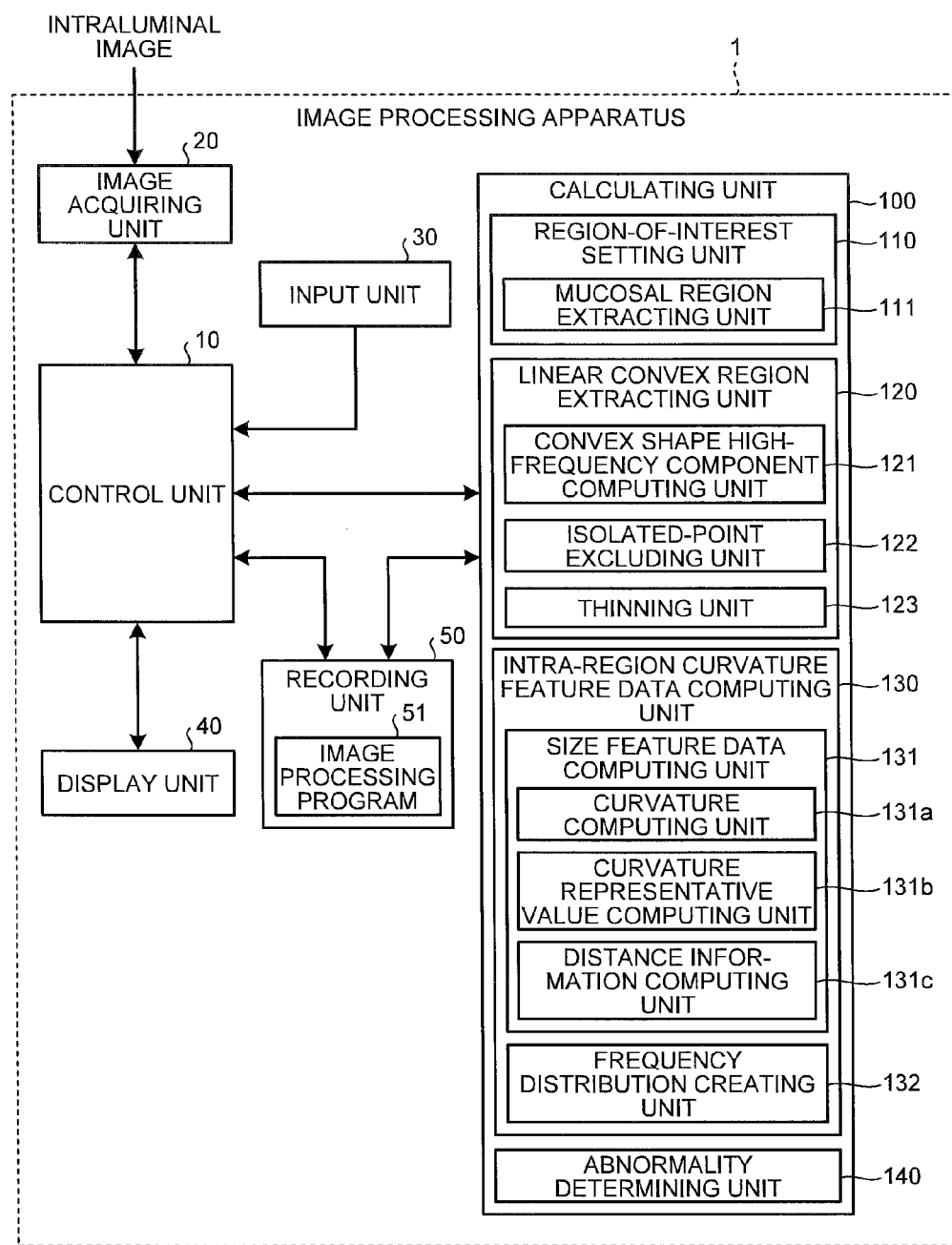
FIG. 1 is a block diagram illustrating a configuration of an image processing apparatus according to a first embodiment of the present invention.

FIG. 1 is a block diagram illustrating an image processing apparatus according to a first embodiment of the present invention. An image processing apparatus 1 according to the first embodiment is, as an example, an apparatus that performs image processing for determining whether there is a pathologically changed portion (abnormal portion) where a villus which is a microstructure of a mucosal surface is swollen, on an intraluminal image (hereinafter, also simply referred to as an image) which is acquired by capturing an in-vivo lumen by a capsule endoscope. The intraluminal image is normally a color image having a predetermined (e.g., 256 shades) pixel level (pixel value) for R (red), G (green), and B (blue) wavelength components (color components) in each pixel position.

As illustrated in FIG. 1, the image processing apparatus 1 includes a control unit 10 that controls the entire operation of the image processing apparatus 1; an image acquiring unit 20 that acquires image data for an image captured by an endoscope; an input unit 30 that accepts input signals to be inputted from an external source; a display unit 40 that performs various types of display; a recording unit 50 that stores the image data acquired by the image acquiring unit 20 and various programs; and a calculating unit 100 that performs predetermined image processing on the image data.

The control unit 10 is implemented by hardware such as a CPU. By reading various types of programs recorded in the recording unit 50, the control unit 10 performs, for example, instructions and data transfer to the units composing the image processing apparatus 1, according to image data inputted from the image acquiring unit 20, an operation signal inputted from the input unit 30, etc., and thereby performs overall control of the entire operation of the image processing apparatus 1.

The image acquiring unit 20 is composed as appropriate, according to the mode of a system including an endoscope. For example, when a portable recording medium is used to pass image data with a capsule endoscope, the image acquiring unit 20 is composed of a reader device that allows the recording medium to be removably placed therein and that reads image data of a recorded image. In addition, when a server that saves image data of images captured by the endoscope is set up, the image acquiring unit 20 is composed of a communication device or the like which is connected to the server, and acquires image data by performing data communication with the server. Alternatively, the image acquiring unit 20 may be composed of an interface device or the like that accepts as input an image signal from the endoscope through a cable.

The input unit 30 is implemented by input devices, e.g., a keyboard, a mouse, a touch panel, and various types of switches, and outputs an accepted input signal to the control unit 10.

The display unit 40 is implemented by a display device such as an LCD or an EL display, and displays various types of screens including an intraluminal image, under control of the control unit 10.

The recording unit 50 is implemented by, for example, various types of IC memories such as a ROM and a RAM, e.g., updatable and recordable flash memories, a hard disk which is built in or connected by a data communication terminal, or an information recording device such as a CD-ROM and a reading device therefor. The recording unit 50 stores a program that causes the image processing apparatus 1 to operate and causes the image processing apparatus 1 to perform various functions, data to be used during the execution of the program, etc., in addition to image data acquired by the image acquiring unit 20. Specifically, the recording unit 50 stores an image processing program 51 for determining whether there is an abnormal portion of a villus on a mucosal surface, various information to be used during the execution of the program, etc.

The calculating unit 100 is implemented by hardware such as a CPU. By reading the image processing program 51, the calculating unit 100 performs image processing on an intraluminal image, and performs various calculation processes for determining whether there is an abnormal portion of a villus on a mucosal surface.

Next, a configuration of the calculating unit 100 will be described.

As illustrated in FIG. 1, the calculating unit 100 includes a region-of-interest setting unit 110 that sets a region of interest in a processing target intraluminal image; a linear convex region extracting unit 120 that extracts regions in the form of a line (hereinafter, also referred to as linear regions) each having a predetermined number or more of continuously-arranged pixels whose pixel values are higher than those of their neighboring pixels; an intra-region curvature feature data computing unit 130 that computes a distribution of feature data based on the curvatures of one or more arcs along each of the linear regions (hereinafter, also referred to as curvature feature data); and an abnormality determining unit 140 that determines whether there is an abnormal portion in the region of interest, based on the curvature feature data.

Of them, the region-of-interest setting unit 110 includes a mucosal region extracting unit 111 that extracts a mucosal region by excluding regions other than mucosa such as residues and dark portions from the image, and sets the extracted mucosal region as a region of interest.

The linear convex region extracting unit 120 includes a convex shape high-frequency component computing unit 121, an isolated-point excluding unit 122, and a thinning unit 123.

The convex shape high-frequency component computing unit 121 computes the strengths of components whose spatial frequencies are greater than or equal to a predetermined value (hereinafter, referred to as high-frequency components), in a pixel region with higher pixel values than its neighboring pixels. Note that in the following the pixel region with higher pixel values than its neighboring pixels is also referred to as a convex-shaped region or simply a convex shape, and a pixel region that has the convex shape and has high-frequency components whose strengths are greater than or equal to the predetermined value is also referred to as a convex-shaped high-frequency region. In addition, the strengths of high-frequency components in the convex-shaped high-frequency region are also referred to as projection shape's high-frequency components.

The isolated-point excluding unit 122 excludes isolated points as normal villi, based on the projection shape's high-frequency components computed by the convex shape high-frequency component computing unit 121. Here, the isolated point refers to a region in the convex-shaped high-frequency region that has a smaller number of consecutive pixels than a predetermined threshold value in all circumferential directions of the convex-shaped high-frequency region.

The thinning unit 123 thins the convex-shaped high-frequency region.

The intra-region curvature feature data computing unit 130 includes a size feature data computing unit 131 that computes the curvatures of one or more arcs along a linear region and distance information corresponding to imaging distances to the arcs, as arc size feature data; and a frequency distribution creating unit 132 that creates a frequency distribution of the arc size feature data. Of them, the size feature data computing unit 131 includes a curvature computing unit 131a that computes the curvatures of one or more arcs from a linear region; a curvature representative value computing unit 131b that computes a representative value from the computed curvatures of one or more arcs; and a distance information computing unit 131c that computes distance information from an intraluminal image imaging position (i.e., the position of the capsule endoscope) to the convex region that forms a linear shape.

Figure 2:
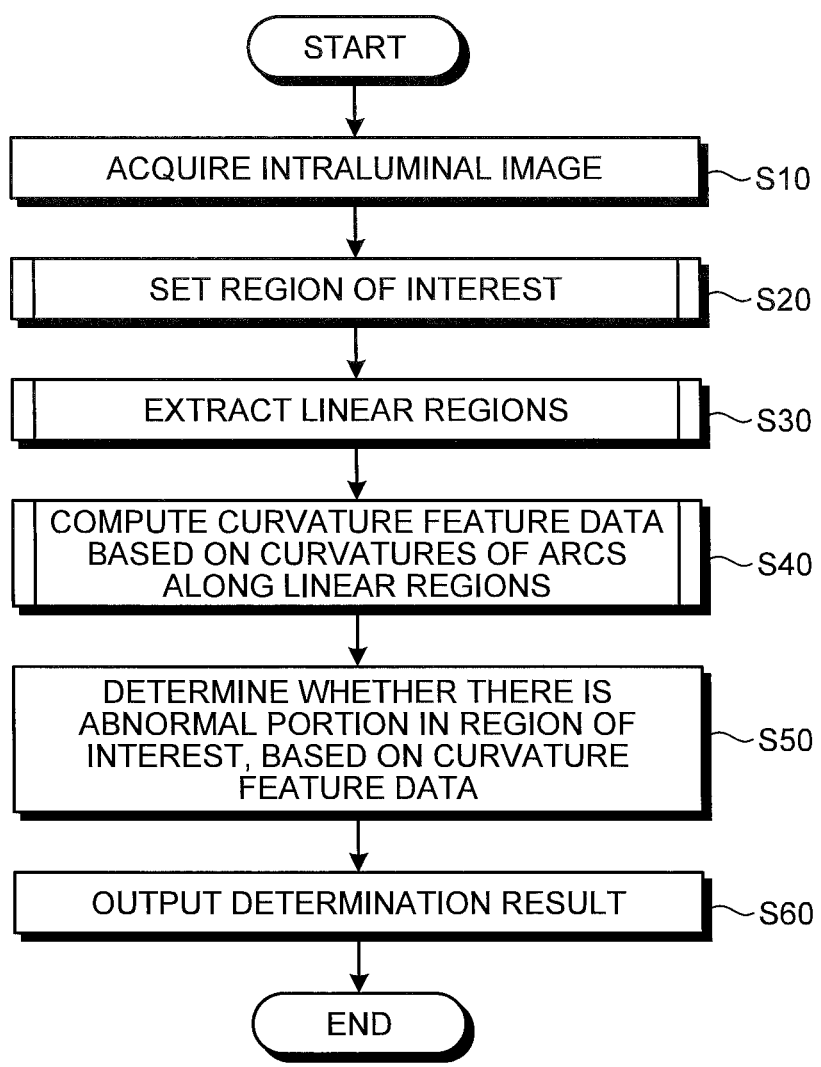
FIG. 2 is a flowchart illustrating the operation of the image processing apparatus illustrated in FIG. 1.

Next, the operation of the image processing apparatus 1 will be described. FIG. 2 is a flowchart illustrating the operation of the image processing apparatus 1.

First, at step S10, the calculating unit 100 reads image data recorded in the recording unit 50 and thereby acquires a processing target intraluminal image.

Figure 3:
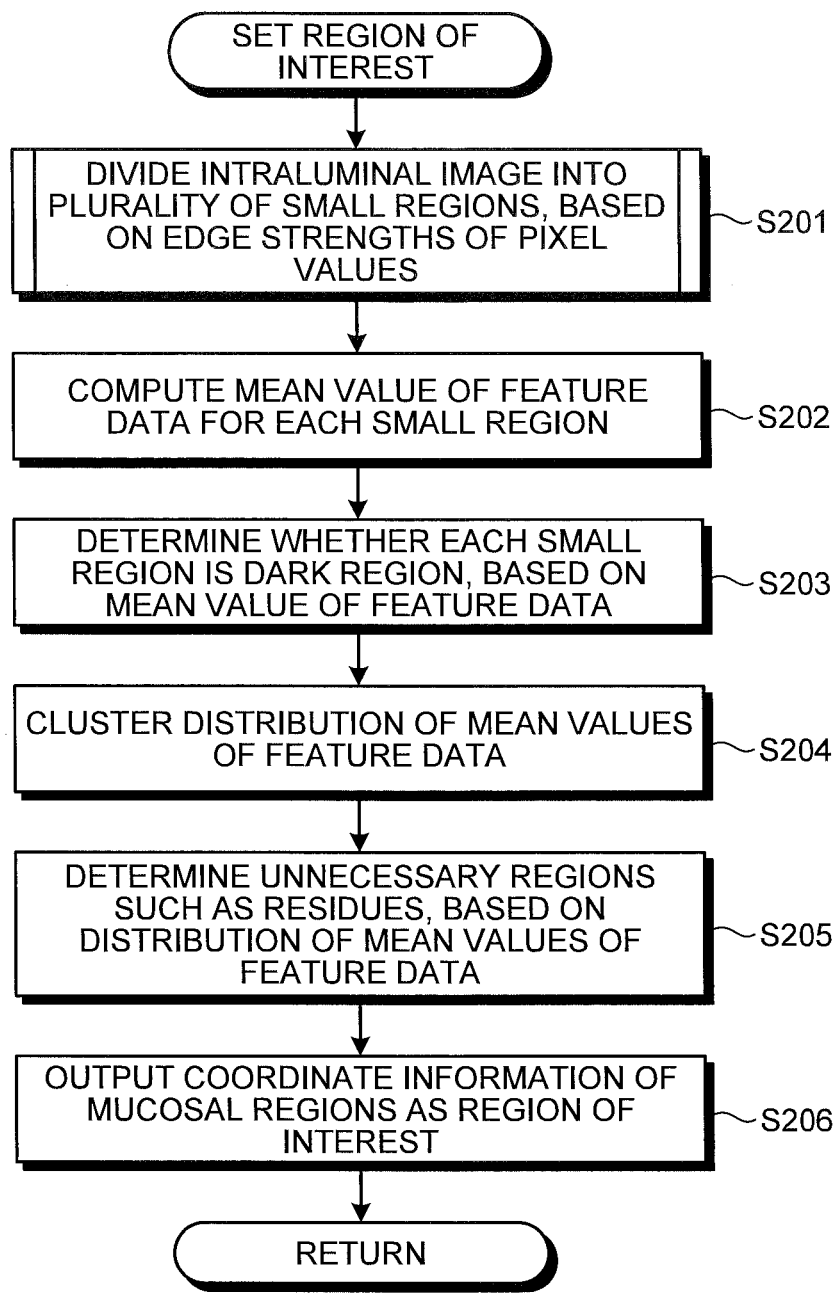
FIG. 3 is a flowchart illustrating the details of processes performed by a region-of-interest setting unit illustrated in FIG. 1.

At subsequent step S20, the region-of-interest setting unit 110 sets a region of interest in the intraluminal image. FIG. 3 is a flowchart illustrating the details of processes performed by the region-of-interest setting unit 110.

Figure 4:
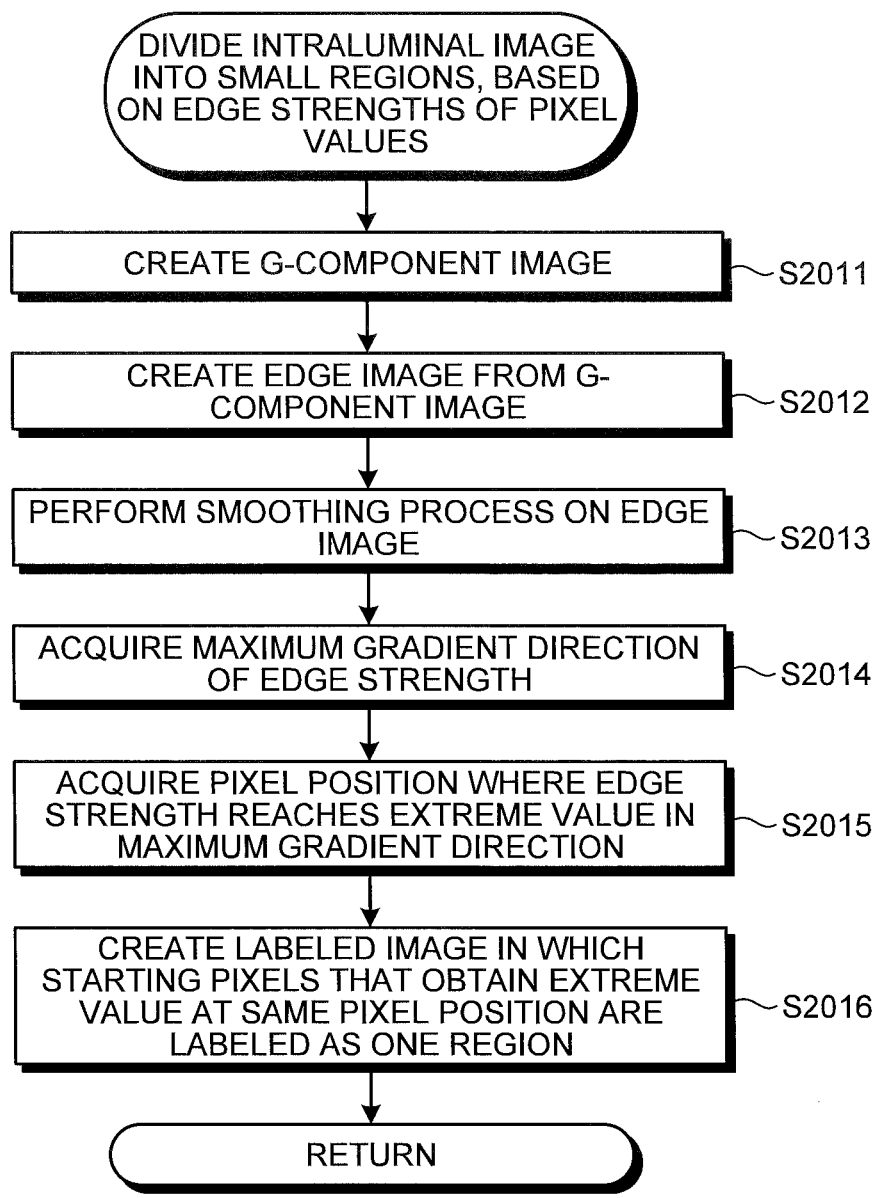
FIG. 4 is a flowchart illustrating the details of processes performed by a mucosal region extracting unit illustrated in FIG. 1.

At step S201, the mucosal region extracting unit 111 divides the intraluminal image into a plurality of small regions, based on the edge strengths of the respective pixels in the intraluminal image. The process of dividing the intraluminal image into a plurality of small regions will be described in detail with reference to FIG. 4. First, at step S2011, the mucosal region extracting unit 111 creates a G-component image, using G components included in the pixel values of the respective pixels in the intraluminal image. The reason that the G components are used here is that the G components are close to a blood absorption band and thus provides the best representation of the structures of objects such as mucosal bumps and residue boundaries. Note that although in the first embodiment the G components are used, instead, for example, other color components, or a luminance value, a color difference (YCbCr conversion), hue, saturation, intensity (HSI conversion), or a color ratio, which is obtained by converting a pixel value (R, G, and B components) may be used.

At step S2012, the mucosal region extracting unit 111 computes edge strengths by performing a filtering process on the G-component image, and creates an edge image that uses the edge strengths as the pixel values of the respective pixels. For the filtering process for computing edge strengths, a first derivative filter such as a Prewitt filter or a Sobel filter, a second derivative filter such as a Laplacian filter or a LOG (Laplacian of Gaussian) filter, or the like, is used (reference: Computer Graphic Arts Society, "Digital Image Processing", pp. 114-121).

The mucosal region extracting unit 111 further performs region division based on the edge strengths of the edge image. As an example of a region division technique, in the first embodiment, a method disclosed in WO 2006/080239 A is applied. Specifically, at step S2013, a smoothing process is performed on the edge image to remove noise. At subsequent step S2014, a direction in which the maximum gradient of edge strength is obtained (maximum gradient direction) is acquired for each pixel position in the edge image. Then, at step S2015, a search is performed in the edge image from each pixel (starting pixel) in the maximum gradient direction, and a pixel position is acquired where the pixel value (edge strength) reaches an extreme value. Furthermore, at step S2016, a labeled image is created in which starting pixels that obtain an extreme value at the same pixel position are labeled as one region. Here, the labeled image refers to an image that uses label numbers (1 to n, n is the number of labels) which are obtained by labeling, as the pixel values of the respective pixels. A pixel region having the same pixel value in the labeled image corresponds to each small region obtained by performing region division on the intraluminal image. Thereafter, processing returns to the main routine.

Note that for a method of dividing the intraluminal image into regions, any publicly known method other than the above-described method may be applied. Specifically, a watershed algorithm (reference: Luc Vincent and Pierre Soille, "Watersheds in digital spaces: An efficient algorithm based on immersion simulations", IEEE Transactions on Pattern Analysis and Machine Intelligence, Vol. 13, No. 6, pp. 583-598, June 1991) may be used. The watershed algorithm is a method of dividing an image such that, when water is filled into terrain where the pixel value information of an image is regarded as a height, boundaries are created between water accumulated in different depressions.

In addition, in the first embodiment, region division based on the edge is performed for the purpose of reducing the influence of isolated pixel noise and facilitating an abnormal determination at a subsequent stage by region division along mucosal or residue boundaries, etc.; however, as another region division technique, the intraluminal image may be divided into rectangular regions of a predetermined size. In this case, processes such as creation of an edge image and region division based on the edge strength become unnecessary, enabling to reduce processing time. Alternatively, without performing region division, each pixel may be used as a processing unit in each step which will be described below. In this case, the process at step S201 can be omitted.

At step S202 subsequent to step S201, the mucosal region extracting unit 111 computes a mean value of feature data for each small region which is obtained by the region division. More specifically, the mucosal region extracting unit 111 computes a mean value of each of R, G, and B components from the pixel values of the respective pixels in the small region. Then, by performing HSI conversion (reference: Computer Graphic Arts Society, "Digital Image Processing", p. 64 (HSI conversion and inverse conversion)) on these mean values, a hue mean value of the small region is computed. The reason that the hue mean value is computed here is that objects such as the mucosa and the contents in a lumen can be determined to a certain extent by color feature data such as hue, from differences in the absorption characteristics of blood, bile, etc., which are the components of the mucosa and the contents in a lumen. Basically, the hues of stomach mucosa, intestinal mucosa, and contents change in this order from a red-based hue to a yellow-based hue.

Note that a hue mean value of each small region may be obtained by computing hues by performing HSI conversion on the pixel values (R, G, and B components) of the respective pixels in the small region, and then computing a mean value of the hues of the respective pixels. Alternatively, instead of hues, for example, a mean value of feature data such as color differences or color ratios (G/R or B/G) may be computed.

At step S203, the mucosal region extracting unit 111 determines, based on the mean values of feature data, whether each small region is a dark region. More specifically, the mucosal region extracting unit 111 first creates a determination result list for the small regions. Here, the determination result list refers to a list where the label numbers in the labeled image obtained when the intraluminal image is divided into a plurality of small regions are associated with pieces of flag information for the label numbers, respectively. Note that the size of the determination result list corresponds to the number of labels n. Subsequently, the mucosal region extracting unit 111 initializes the determination result list, and assigns a mucosal region flag (0: mucosal region) to all of the small regions. Then, using, as feature data, G components that provide the best representation of the structures of objects such as mucosal bumps and residue boundaries, a dark region flag (1: dark region) is assigned to a small region whose mean value of the feature data is less than or equal to a predetermined threshold value. Note that the threshold value used at this time is determined within a range where a change in the hue mean value, etc., of the small region maintains linearity with respect to a change in intensity. This is because in the dark region the linearity breaks down due to the influence of noise, etc.

At step S204, the mucosal region extracting unit 111 clusters a distribution of the mean values of feature data (hue mean values) which are computed at step S202. Here, the clustering is a technique for dividing a data distribution in a feature space into chunks called clusters, based on the similarity between data, and can be performed by various publicly known techniques such as a hierarchical method and a k-means method (reference: Computer Graphic Arts Society: "Digital Image Processing", pp. 231-232 (clustering)). In the first embodiment, since a process using a histogram of data in a hue space is performed at a subsequent stage, there is shown a procedure of clustering based on the histogram of data, with the feature space used as a one-dimensional space of hue. Note that the clustering does not need to be limited thereto, and other techniques may be used.

Figure 5:
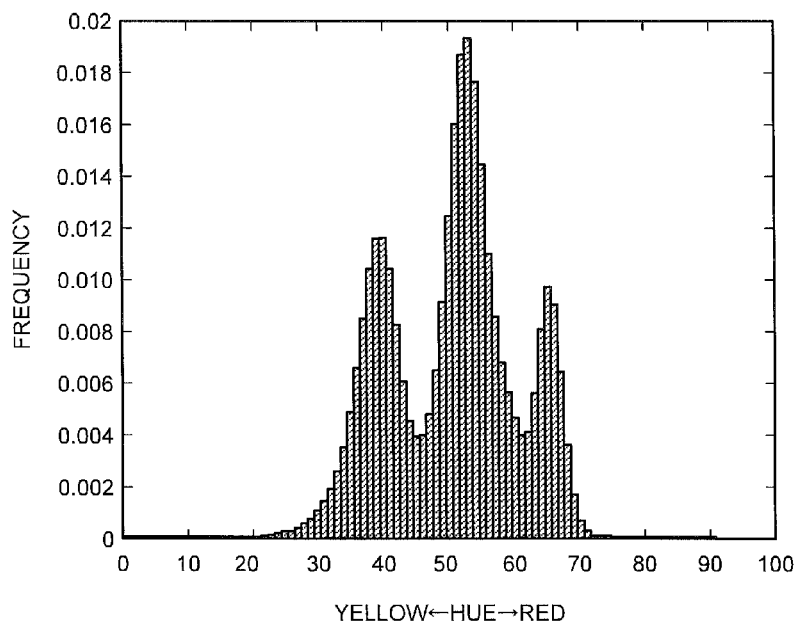
FIG. 5 is an example of creation of a histogram showing the frequency of hue mean values.
Figure 6:
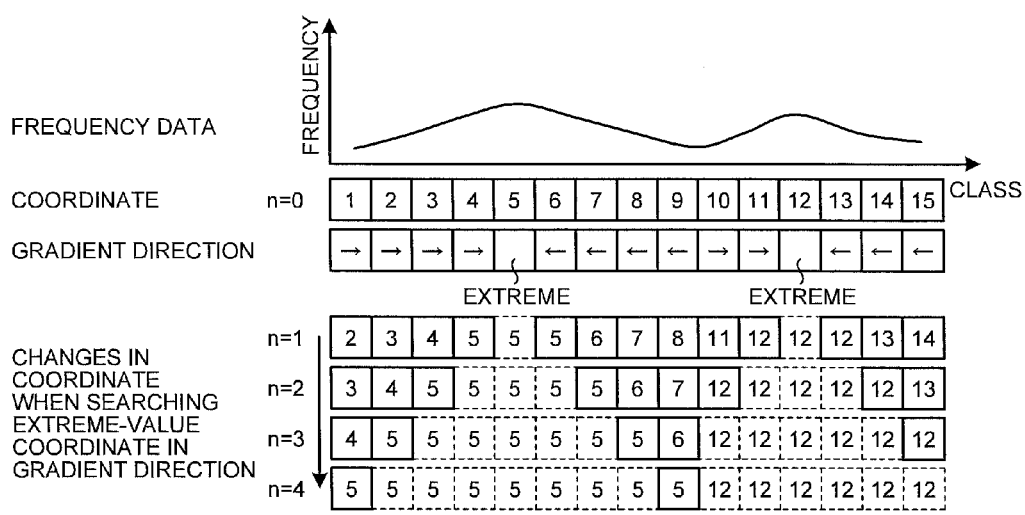
FIG. 6 is a schematic diagram describing a clustering method for dividing a histogram into a plurality of clusters using the valleys of the histogram as boundaries.

The process of clustering a distribution of hue mean values will be described in detail below with reference to FIGS. 5 to 7. First, a histogram with a horizontal axis being the class intervals of hue mean values and a vertical axis being the frequencies of hue mean values corresponding to each class interval is created. At this time, the hue mean values are acquired from small regions that are assigned the mucosal region flag (0: mucosal region) in the determination result list. In addition, the class intervals are set by dividing a yellow-based to red-based hue range which sufficiently includes a hue distribution range of the intraluminal image, by predetermined intervals which are determined in advance. FIG. 5 is an example of creation of a histogram. Note that in FIG. 5 normalization is performed such that the sum total of frequencies is 1.

Subsequently, a distribution of the hue mean values is divided into a plurality of clusters using the valleys of the histogram as boundaries. FIG. 6 is a schematic diagram describing a clustering method. A frequency data graph illustrated in FIG. 6 represents changes in the frequency of the histogram by a line in a simplified manner. In addition, here, the class intervals represented on the horizontal axis of the histogram are represented by coordinates for convenience sake. Note that to limit the number of clustered clusters, the width of the class intervals of the histogram may be changed or a smoothing process may be performed on the histogram before clustering.

For such frequency data, a gradient direction for each coordinate is determined. Here, the gradient direction is a direction that is determined based on the difference between frequency data for a coordinate of interest and frequency data for coordinates adjacent to the coordinate of interest. A direction in which the value of frequency increases is represented by an arrow. Note that a coordinate provided with "extreme" is an extreme-value (maximum-value) coordinate whose frequency is higher than any of its adjacent coordinates.

Furthermore, an extreme-value coordinate is searched for from each coordinate in a gradient direction. In FIG. 6, changes in a coordinate in searching for an extreme-value coordinate are represented by numerical values of coordinates from a position of a starting coordinate (each coordinate with n=0) in a downward direction. For example, when the search starts with a coordinate "1", since the gradient direction of the coordinate "1" is a right direction, a coordinate "2" on the immediate right of the coordinate "1" is obtained at the first search step (n=1). Subsequently, since the gradient direction of the coordinate "2" is also the right direction, a coordinate "3" on the immediate right of the coordinate "2" is obtained at the second search step (n=2). Thereafter, the search is sequentially continued in the gradient direction, thereby eventually reaching a coordinate "5" which is an extreme-value coordinate (n=4). Next, when the search starts with the coordinate "2", the coordinate "5" which is an extreme-value coordinate is still eventually reached (n=3). Likewise, when the same search is performed starting with each of all coordinates, the coordinate "5" is reached in the case of the coordinates "1" to "9" being a starting coordinate, and a coordinate "12" is reached in the case of the coordinates "10" to "15" being a starting coordinate.

As a result of this search, the coordinates "1" to "9" that obtain the coordinate "5" as an extreme-value coordinate are set as a first cluster, and the coordinates "10" to "15" that obtain the coordinate "12" as an extreme-value coordinate are set as a second cluster, by which the data distribution can be divided into clusters using the valleys of the histogram as boundaries.

Figure 7:
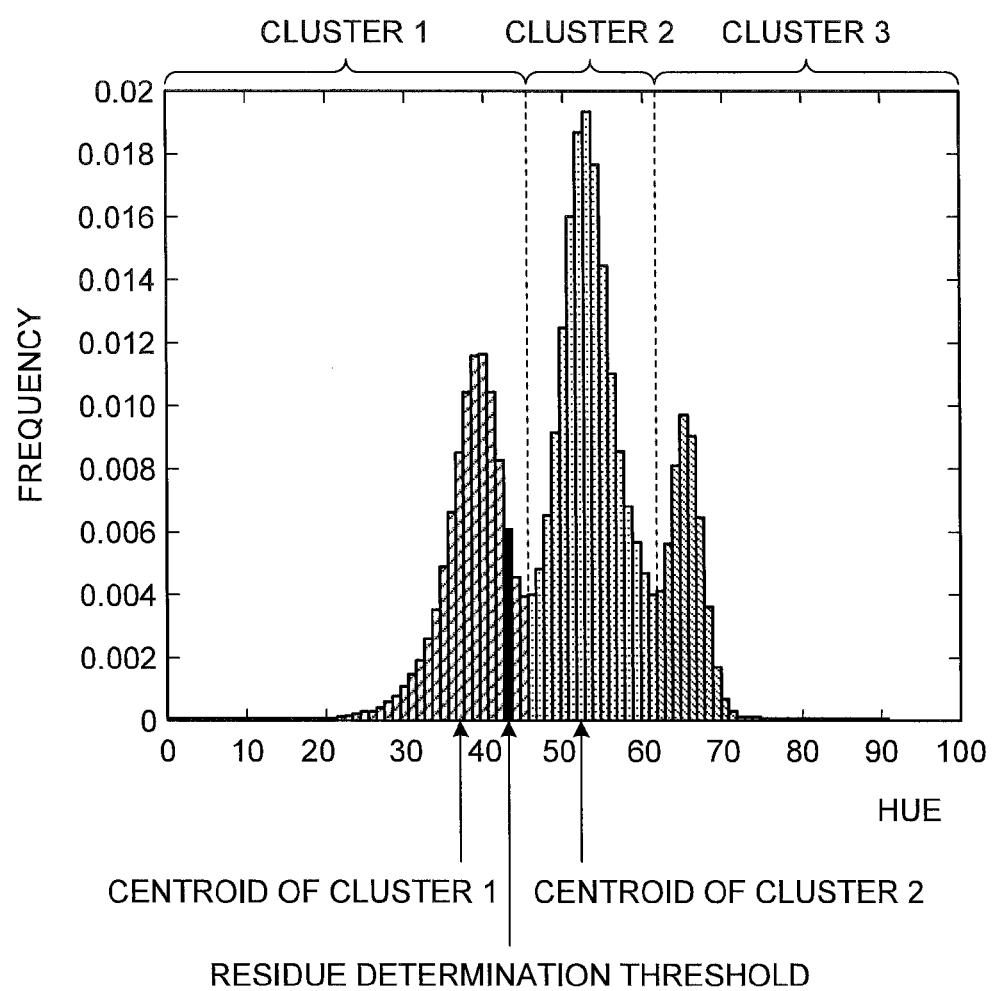
FIG. 7 is a graph illustrating results obtained by clustering the histogram illustrated in FIG. 5.

FIG. 7 is a graph illustrating the result of applying the above-described clustering method to the histogram illustrated in FIG. 5. In the case of FIG. 5, the hue mean values can be classified into three clusters 1 to 3 using the valleys of the histogram as boundaries.

At step S205 subsequent to step S204, the mucosal region extracting unit 111 determines unnecessary regions such as residues, based on the distribution of feature data mean values. Here, in the lumen, in general, due to the difference in absorption characteristics between bile and blood, unnecessary regions such as residues have a yellow-based color. Hence, of the clusters obtained at step S204, a cluster whose hue leans toward yellow-based is estimated as a cluster including hue mean value data of small regions which are unnecessary regions (hereinafter, referred to as an unnecessary region cluster), by which the unnecessary region cluster is identified.

More specifically, first, a centroid $\bar{\omega}_a$ (the bar indicates that the symbol "-" representing "mean" is described above $\omega$) of each cluster "a" (a is the cluster number, and in the case of FIG. 7 a=1, 2, and 3) is computed by the following equation (1), using the sum total $\omega_a$ of hue mean values in the cluster "a" and the number of pieces of data belonging to the cluster "a" (i.e., the number of small regions) $m_a$.

$$\bar{\omega}_a = \frac{\omega_a}{m_a} \qquad (1)$$

In equation (1), $$\omega_a = \sum_{i=1}^{n} f(h_i)$$

where $$f(h_i) = \begin{cases} h_i : \text{a\_min} \leq h_i \leq \text{a\_max} \\ 0 : h_i < \text{a\_min}, \text{a\_max} < h_i \end{cases}$$

In addition, the symbol i represents the label number of a small region. The symbol n represents the number of labels, i.e., the number of small regions in the image. The symbol $h_i$ represents the hue mean value of the small region i. The symbol a_min represents the minimum value of the hue mean values of the cluster "a", and the symbol a max represents the maximum value of the hue mean values of the cluster "a". Furthermore, $$m_a = \sum_{i=1}^{n} I_i$$

where $$I_i = \begin{cases} 1 : \text{a\_min} \leq h_i \leq \text{a\_max} \\ 0 : h_i < \text{a\_min}, \text{a\_max} < h_i \end{cases}$$

In the histogram of hue mean values illustrated in FIG. 7, the more it goes to the left on the hue axis (horizontal axis), the more intense a yellow-based color. Hence, a residue determination threshold value indicating a residue hue range is computed from training data which is acquired in advance, and a cluster whose centroid is located more on the left side of the graph than the residue determination threshold value is determined to be an unnecessary region cluster. For example, in FIG. 7, cluster 1 is determined to be an unnecessary region cluster.

Furthermore, the mucosal region extracting unit 111 assigns an unnecessary region flag (2: unnecessary region)

to small regions belonging to the unnecessary region cluster among the small regions that are assigned the mucosal region flag (0: mucosal region) in the determination result list.

Note that in the determination of unnecessary regions, the same process may be performed using the mean values of feature data other than hue.

At subsequent step S206, the region-of-interest setting unit 110 acquires coordinate information of mucosal regions (regions other than the unnecessary regions) in the image, based on the labeled image and the flag information in the determination result list, and outputs the coordinate information of mucosal regions as a region of interest. Thereafter, processing returns to the main routine.

Figure 8:
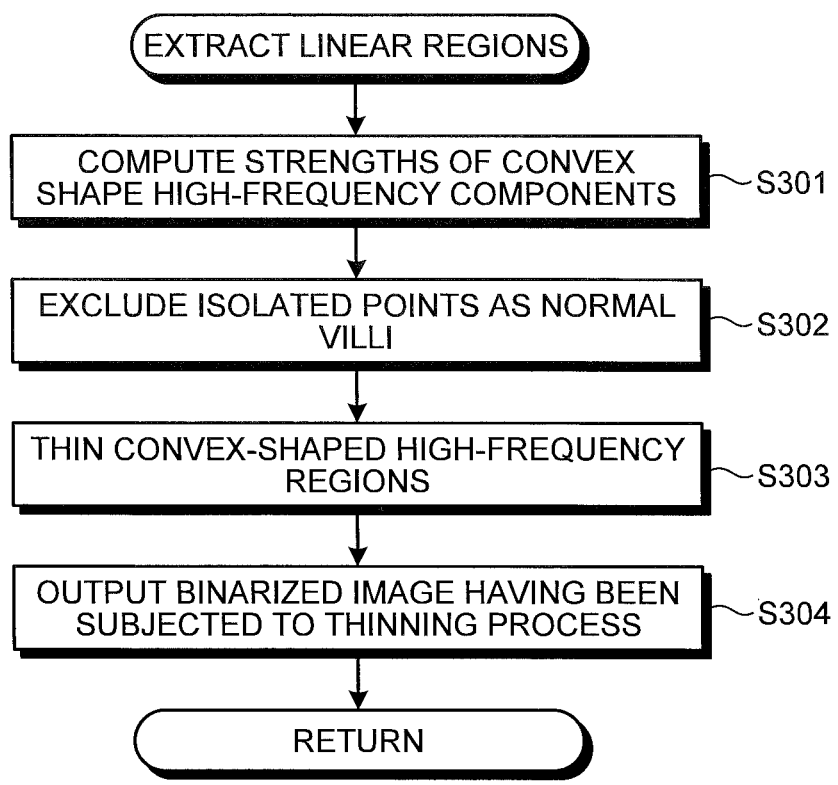
FIG. 8 is a flowchart illustrating the details of processes performed by a linear convex region extracting unit illustrated in FIG. 1.

At step S30 subsequent to step S20, the linear convex region extracting unit 120 extracts, from the region of interest in the image, linear regions each having a predetermined number or more of continuously-arranged pixels whose pixel values are higher than those of their neighboring pixels. FIG. 8 is a flowchart illustrating the details of processes performed by the linear convex region extracting unit 120.

At step S301, the convex shape high-frequency component computing unit 121 computes the strengths of projection shape's high-frequency components. More specifically, first, the convex shape high-frequency component computing unit 121 creates a G-component image using G components included in the pixel values of the respective pixels in the intraluminal image. The reason that the G components are used is that, as described above, the G components are close to the blood absorption band and thus provides the best representation of the structures of objects. Note that although in the first embodiment the G components are used, instead, for example, other color components, or a luminance value, a color difference (YCbCr conversion), hue, saturation, intensity (HSI conversion), or a color ratio, which is obtained by converting a pixel value (R, G, and B components) may be used.

Figure 9:
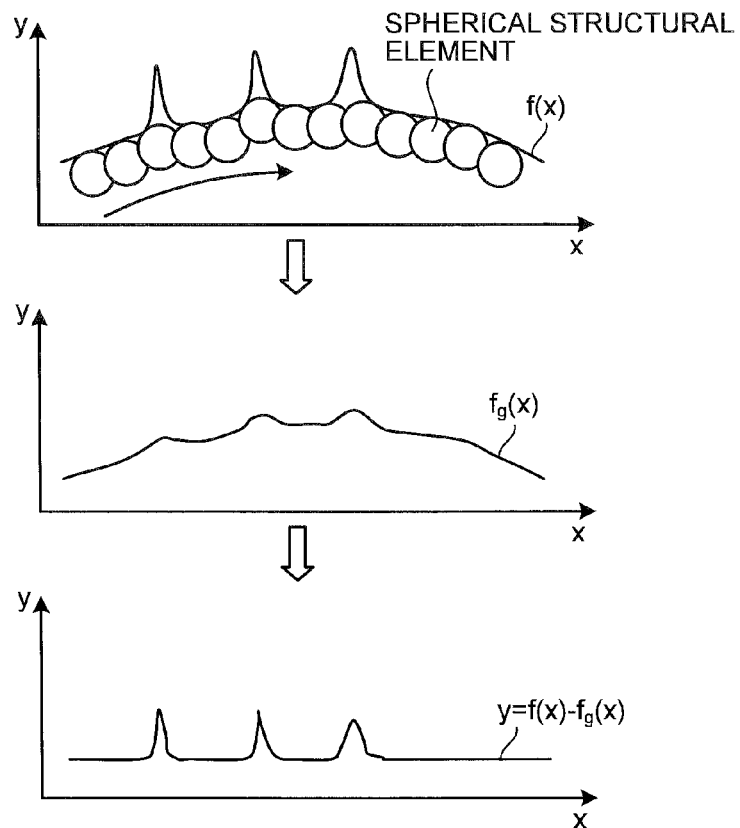
FIG. 9 is a schematic diagram describing a top-hat transform.

Subsequently, the convex shape high-frequency component computing unit 121 performs a top-hat transform by grayscale morphology (reference: By Hidefumi Kobatake, "Morphology", CORONA PUBLISHING CO., LTD., pp. 103-104) on the G-component image. Here, the top-hat transform refers to a process in which, as illustrated in FIG. 9, an output $y=f_g(x)$ which is obtained by performing a low-pass filter process on an original signal output $y=f(x)$ is subtracted from the original signal output $f(x)$, and the output of a high-pass filter process $y=f(x)-f_g(x)$ is given. In addition, for the low-pass filter process performed at this time, a morphological opening process is performed. The opening process corresponds to a process of tracing the provided signal $f(x)$ from the bottom by spherical structural elements such as those illustrated in FIG. 9. At this time, in a portion where the signal changes slowly, the signal output $y=f(x)$ is traced accurately, but in a portion with a positive pulse, a sphere (structural element) cannot fit completely and thus the signal output goes out of a traceable range. Hence, by the opening process, the output $y=f_g(x)$ where the positive pulses are removed can be obtained. By subtracting the output $y=f_g(x)$ from the original signal output $y=f(x)$, as a result, high-frequency components in the convex-shaped region which are positive pulse outputs can be acquired.

Note that the strengths of projection shape's high-frequency components may be computed using a high-pass filter process in a Fourier space, Difference of Gaussian (DoG), etc., in addition to the above.

At subsequent step S302, the isolated-point excluding unit 122 extracts isolated points based on the strengths of projection shape's high-frequency components computed at step S301, and excludes the isolated points as normal villi.

Specifically, the isolated-point excluding unit 122 first performs a threshold value process on the strengths of projection shape's high-frequency components, and thereby creates a binarized image. At this time, the isolated-point excluding unit 122 provides 0 to a pixel whose strength of a projection shape's high-frequency component is less than or equal to a predetermined threshold value, and provides 1 to a pixel whose strength is greater than or equal to the threshold value. Note that for the threshold value, for example, the value of a predetermined ratio to one representative value (maximum value or mean value) which is computed from the strengths of projection shape's high-frequency components in the region of interest is set. Alternatively, as the threshold value, a fixed value greater than 0 may be set. In the latter case, the processes of calculating a representative value for projection shape's high-frequency components and calculating a threshold value from the representative value can be omitted. Note that the binarized image created by this process serves as an image from which convex-shaped high-frequency regions have been extracted.

Subsequently, the isolated-point excluding unit 122 performs particle analysis and thereby excludes isolated points from the binarized image. In the first embodiment, as the particle analysis, analysis is performed based on the areas of target regions (particles) in the binarized image. Specifically, the isolated-point excluding unit 122 labels regions with the pixel value 1 in the binarized image and thereby creates a labeled image that is assigned label numbers 1 to s (s is the number of labels). Then, by scanning the labeled image, the number of pixels is counted for each label number, by which an area list is created. Here, the area list is composed of the label numbers and areas for the respective label numbers, and the size of the area list corresponds to the number of labels s. The isolated-point excluding unit 122 further performs a threshold value process on the areas of labeled regions associated with the respective label numbers, using a predetermined threshold value, and determines a labeled region with a label number whose corresponding area is less than or equal to the threshold value, to be an isolated point. The label number of the labeled region determined to be an isolated point is set to 0.

Note that, when an isolated-point exclusion process is performed, particle analysis may be performed using the perimeter length of a target region, a Feret diameter (maximum Feret diameter), an absolute maximum length indicating the maximum value of a distance between any two points on a contour of a target region, an equivalent circular diameter indicating the diameter of a circle having an equal area to a target region, or the like, in addition to the area of a target region.

Figure 10:
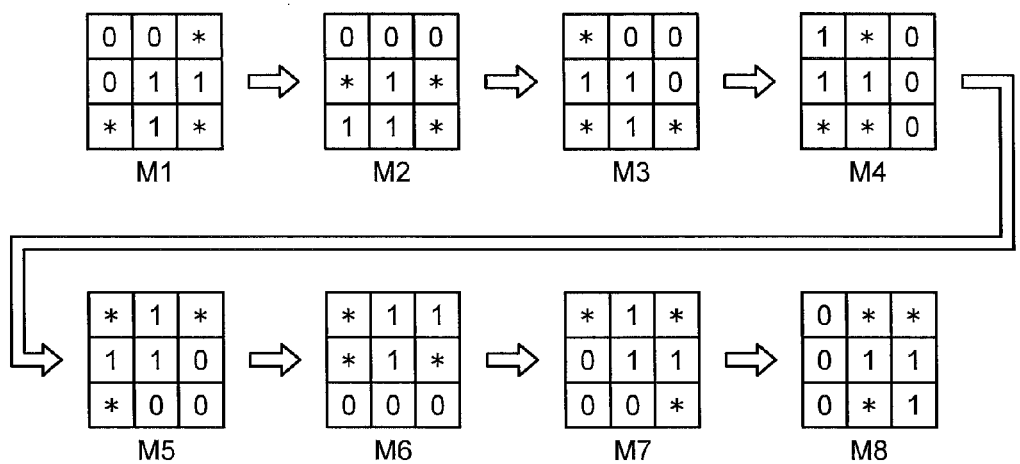
FIG. 10 is a diagram illustrating patterns used to search in an image in a thinning filtering process.

At step S303, the thinning unit 123 thins convex-shaped high-frequency regions. More specifically, the thinning unit 123 performs a thinning process on regions whose label numbers are 1 or more in the labeled image where isolated points have been excluded by the isolated-point excluding unit 122. To do so, the thinning unit 123 first provides the pixel value 0 to a region with the label number 0 and provides the pixel value 1 to a region with the label number 1 or more in the labeled image, and thereby creates a binarized image. Subsequently, the thinning unit 123 performs a thinning filtering process on the binarized image. The thinning filtering process refers to a process in which patterns M1 to M8 of local regions including 3×3 pixels such as those illustrated in FIG. 10 are sequentially searched for in the binarized image, and central pixels are deleted (reference: University of Tokyo Press, "Handbook of Image Analysis", pp. 577-578 (thinning and shrinking)). Specifically, first, the pattern M1 is searched for in the binarized image, and the pixel value of the central pixel is changed to 0. Note that "*" illustrated in FIG. 10 represents a pixel that does not need to be considered. Then, the pattern M2 is searched for in the binarized image, and the pixel value of the central pixel is change to 0. Such a process is repeated for up to the pattern M8, which serves as one cycle. This cycle is repeated until there is no more point to delete.

Furthermore, at step S304, the linear convex region extracting unit 120 outputs the binarized image having been subjected to the thinning process (hereinafter, also referred to as a linear image). Thereafter, processing returns to the main routine.

Figure 11:
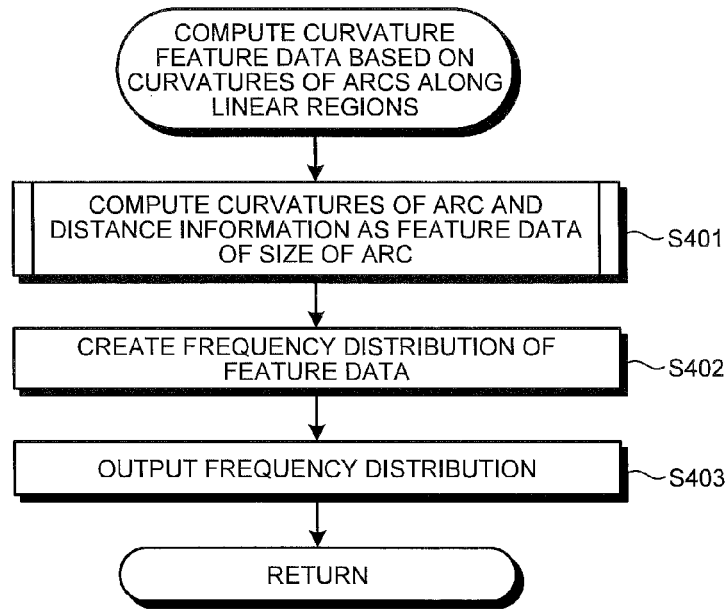
FIG. 11 is a flowchart illustrating the details of processes performed by an intra-region curvature feature data computing unit illustrated in FIG. 1.

At step S40 subsequent to step S30, the intra-region curvature feature data computing unit 130 computes curvature feature data based on the curvatures of arcs along the linear regions. FIG. 11 is a flowchart illustrating the details of processes performed by the intra-region curvature feature data computing unit 130.

Figure 12:
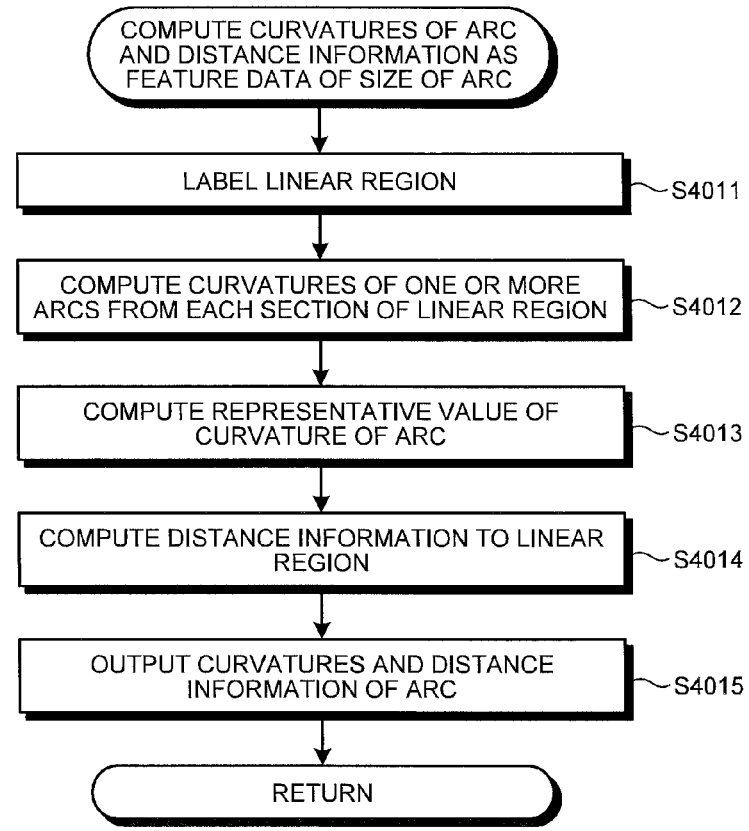
FIG. 12 is a flowchart illustrating the details of processes performed by a size feature data computing unit illustrated in FIG. 1.

At step S401, the size feature data computing unit 131 computes, as arc size feature data, the curvatures of an arc along a linear region which is observed in the linear image, and distance information corresponding to an imaging distance from an imaging position (capsule endoscope) to the arc. The process performed by the size feature data computing unit 131 will be described in detail with reference to FIG. 12.

At step S4011, the size feature data computing unit 131 labels a continuous linear region in the linear image. In the first embodiment, labeling for an eight-connection connecting component is performed. Specifically, the size feature data computing unit 131 first performs a raster scan on the linear image and searches for a pixel that is not assigned a label number among the pixels with the pixel value 1. Then, when a pixel that is not assigned a label number is found, the pixel is set as a pixel of interest.

When a pixel adjacent above or present at the upper left of the pixel of interest has a label number, the size feature data computing unit 131 assigns the label number of the pixel adjacent above or present at the upper left to the pixel of interest. Thereafter, when the label number of a pixel adjacent to the left side of the pixel of interest differs from the label number of the pixel of interest, the fact that the label numbers of the pixel of interest and the pixel adjacent to the left side thereof belong to the same connecting component is recorded in a look-up table which is prepared in advance.

In addition, when the label numbers of the pixels adjacent above and present at the upper left of the pixel of interest are 0 (no label number) and the pixel adjacent to the left side has a label number, the label number of the pixel adjacent to the left side is assigned to the pixel of interest.

Furthermore, when a label number is not assigned to any of the pixels adjacent above, adjacent to the left side, and present at the upper left of the pixel of interest, the size feature data computing unit 131 assigns a new label number to the pixel of interest.

The size feature data computing unit 131 performs these processes on all pixels in the linear image. Then, finally, a raster scan is performed again, and by referring to the look-up table, the smallest label number among label numbers that are assigned to a pixel group belonging to the same connecting component is selected and reassigned to the pixel group (reference: Computer Graphic Arts Society, "Digital Image Processing", pp. 181-182).

Figure 13:
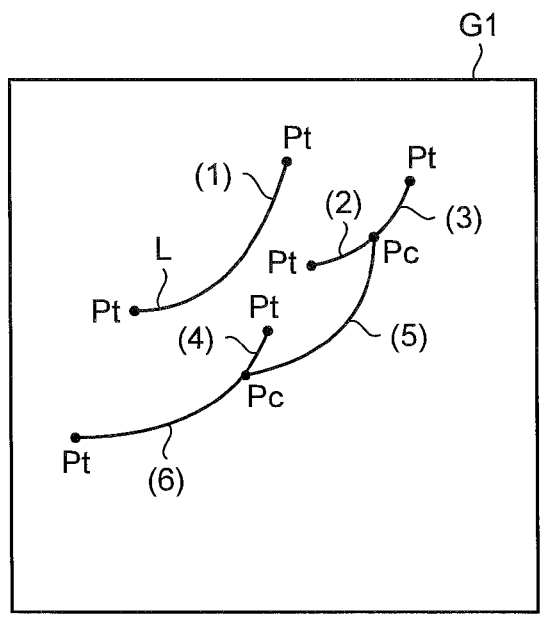
FIG. 13 is a schematic diagram illustrating sections of linear regions.

At step S4012, as illustrated in FIG. 13, the curvature computing unit 131a computes the curvatures of one or more arcs from each section of a linear region L that is delimited by endpoints $P_t$ of the linear region L and/or intersection points $P_c$ of linear regions L in a linear image G1 (i.e., between endpoints, between intersection points, or between an endpoint and an intersection point).

Figure 14:
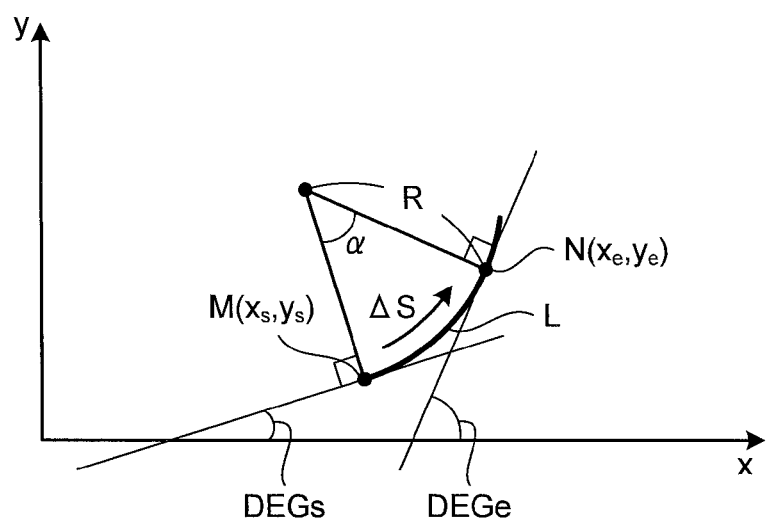
FIG. 14 is a schematic diagram describing a method of computing a curvature of an arc.

More specifically, the curvature computing unit 131a scans the linear image and thereby detects a pixel at an endpoint $P_t$ of a linear region or an intersection point $P_c$ of linear regions. Then, as illustrated in FIG. 14, the detected pixel at the endpoint $P_t$ or intersection point $P_c$ is set as a start point pixel $M(x_s, y_s)$. Furthermore, a pixel that is reached by following the linear region L (i.e., pixels assigned the same label number) by a predetermined number of pixels $\Delta s$ from the start point pixel $M(x_s, y_s)$ is set as an end point pixel $N(x_e, y_e)$.

Subsequently, the curvature computing unit 131a computes a slope of a tangent line at the start point pixel M and a slope of a tangent line at the end point pixel N. In the present embodiment, the slopes of the respective tangent lines are represented by angles $DEG_s$ and $DEG_e$ formed with an x-axis. The angle $DEG_i$ (i=s and e) formed between each tangent line and the x-axis is computed using the following equation (2) by setting two pixels (coordinates $(x_e, y_e)$ and $(x_b, y_b)$) which are separated forward and backward from the start point pixel M (or the end point pixel N) along the linear region L by a predetermined number of pixels.

$$DEG_i = -\left\{\tan^{-1}\left(\frac{y_b - y_a}{x_b - x_a}\right)\right\} \times 180 \times \frac{1}{\pi} \tag{2}$$

Note that when the upper left of the linear image is set to the coordinates (0, 0) and each row is scanned in the right direction from the upper left, the coordinates $(x_a, y_a)$ are forward coordinates of the start point pixel M (or the end point pixel N), and the coordinates $(x_b, y_b)$ are backward coordinates of the start point pixel M (or the end point pixel N). Note, however, that when coordinates go out of the linear region L by the separation from the start point pixel M (or the end point pixel N) by the predetermined number of pixels (when coordinates go beyond the endpoint $P_t$ or the intersection point $P_a$), the coordinates of the endpoint $P_t$ or the intersection point $P_c$ of the linear region L are set to either one of the above-described coordinates $(x_a, y_a)$ and $(x_b, y_b)$.

Subsequently, the curvature computing unit 131a computes a central angle $\alpha$ of an arc between the start point pixel M and the end point pixel N. The central angle $\alpha$ corresponds to the difference between the angle $DEG_e$ and the angle $DEG_e$, i.e., $DEG_e - DEG_s$.

The curvature computing unit 131a further computes a curvature $\kappa$ of the arc between the start point pixel M and the end point pixel N. Here, the curvature $\kappa$ is the reciprocal of a curvature radius R of the arc, and the number of pixels $\Delta s$ corresponding to the length of the arc can be approximated by $R \times \alpha \times (\pi/180)$, and thus, the curvature $\kappa$ is given by the following equation (3):

$$\kappa = \frac{1}{R} = \frac{\alpha \times \frac{\pi}{180}}{\Delta s} \tag{3}$$

Figure 15:
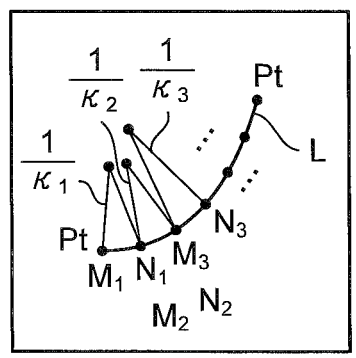
FIG. 15 is a schematic diagram describing a process performed by a curvature computing unit illustrated in FIG. 1.

As illustrated in FIG. 15, the curvature computing unit 131a repeats a computation process for the curvature κ ($\theta_1$, $\kappa_2$, ... ) by shifting the start point pixel M ($M_1$, $M_2$, ... ) and the end point pixel N ($N_1$, $N_2$, ... ) on the linear region L. Then, when the end point pixel N goes beyond the endpoint $P_t$ of the linear region L or the intersection point $P_c$ of the linear regions L, the curvature computing unit 131a ends the computation process for the curvature κ, and assigns a label number which is incremented from 1 in turn, to the linear region L whose curvature κ has been computed.

The curvature computing unit 131a performs such computation of the curvature κ and an assignment of a label number on all linear regions L that are detected from the linear image G1 illustrated in FIG. 13. The numbers in parentheses illustrated in FIG. 13 indicate label numbers assigned to the respective linear regions L.

At subsequent step S4013, the curvature representative value computing unit 131b computes a representative value of the curvature of an arc for each linear region that is assigned the same label number by the curvature computing unit 131a. Note that although in the first embodiment a median is computed as the representative value, the mean value, maximum value, minimum value, etc., of the curvature may be computed as the representative value.

At subsequent step S4014, the distance information computing unit 131c computes distance information in a depth direction from an imaging position to the linear regions. Specifically, the distance information computing unit 131c acquires R component values that have low hemoglobin absorption among the pixel values of the respective pixels and thus provide the best representation of the shape of a mucosal surface layer, from a portion of the original intraluminal image corresponding to the region of interest, and creates an R-component image.

Note that at this step S4014, distance information may be acquired from an image created by other techniques, provided that the image has only a small influence on the microstructures of villi on the mucosa. For example, an image having been subjected to an opening process by grayscale morphology which is described in the process of the convex shape high-frequency component computing unit 121 may be used.

Subsequently, the distance information computing unit 131c computes distance information for the position of each arc whose curvatures are computed by the curvature representative value computing unit 131b. Specifically, R component values for the positions of pixels on an arc are acquired, and a representative value such as the mean value, median, minimum value, or maximum value of the R component values is acquired for each arc. In the first embodiment, the representative value of the R component values is used as distance information corresponding to an imaging distance. Note that in this case the larger the value of the distance information the shorter the imaging distance, and the smaller the value of the distance information the longer the imaging distance. Note also that an R component value for the position of a pixel at the center of curvature of an arc or R component values of an inner region of a circular region or fan-shaped region which is made up of the center of curvature of an arc and a curvature radius may be used as distance information of the arc.

Furthermore, at step S4015, the size feature data computing unit 131 outputs the curvatures and distance information of the arcs as arc size feature data. Thereafter, processing returns to the main routine.

At step S402 subsequent to step S401, the frequency distribution creating unit 132 creates a frequency distribution of the feature data outputted from the size feature data computing unit 131. More specifically, a frequency distribution consisting of two axes, arc curvature and distance information, is created. At this time, the frequency distribution creating unit 132 also computes an amount of statistics such as variance, from the created frequency distribution.

Furthermore, at step S403, the intra-region curvature feature data computing unit 130 outputs, as curvature feature data, the frequency distribution consisting of two axes, arc curvature and distance information. Thereafter, processing returns to the main routine.

At step S50 subsequent to step S40, the abnormality determining unit 140 determines whether there is an abnormal portion in the region of interest, based on the curvature feature data.

Here, arc-shaped regions seen in the intraluminal image include, for example, an abnormal portion where villi on the mucosal surface are swollen, a bubble region where intraluminal fluid forms a bubble shape, and a contour of a structure such as a mucosal groove (hereinafter, referred to as a mucosal contour). In the following, the swollen villi are referred to as abnormal villi.

Figure 16A:
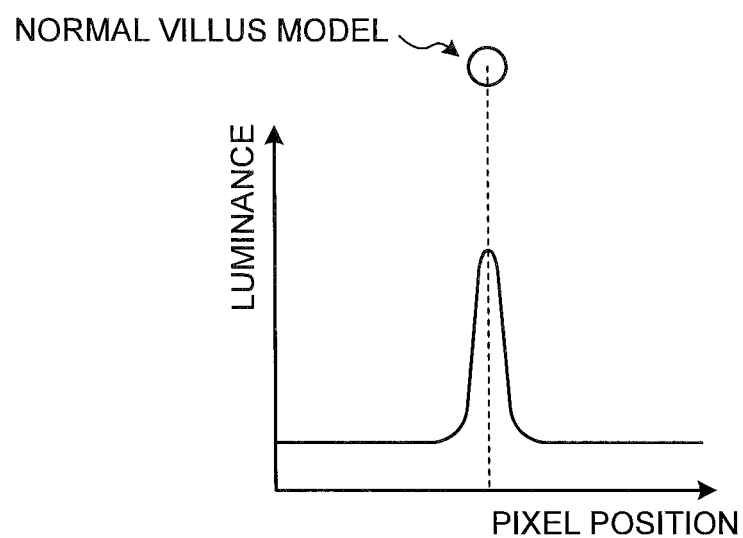
FIG. 16A is a schematic diagram illustrating a normal villus model.
Figure 16B:
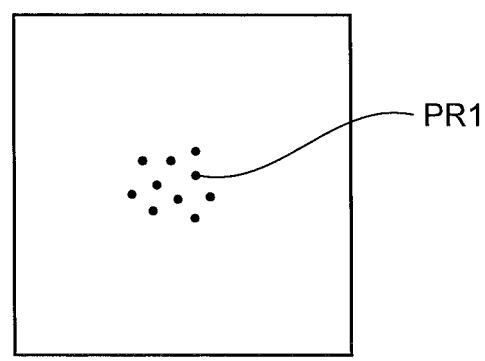
FIG. 16B is a schematic diagram illustrating convex regions corresponding to the normal villus model.

FIG. 16A is a schematic diagram illustrating a normal villus model. A normal villus is normally circular in planar shape viewed in a direction of the normal to the mucosal surface, and forms as a whole a shape where a central portion protrudes. Thus, in the intraluminal image, the central portion of the villus and its neighboring portion have the highest luminance. Hence, when convex regions having higher luminance values than their neighboring pixels are extracted from an intraluminal image where normal villi are displayed, as illustrated in FIG. 16B, dot-like convex regions PR1 corresponding to the central portions of the villi are obtained. Such dot-like convex regions PR1 are excluded in advance as isolated points from the linear image.

Figure 17A:
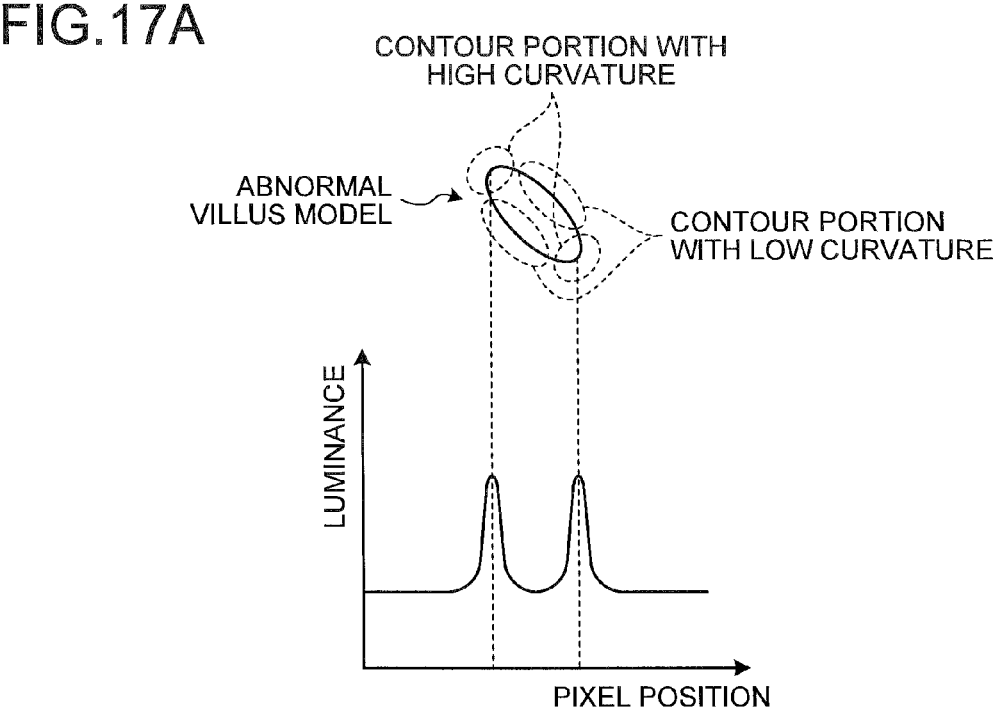
FIG. 17A is a schematic diagram illustrating an abnormal villus model.
Figure 17B:
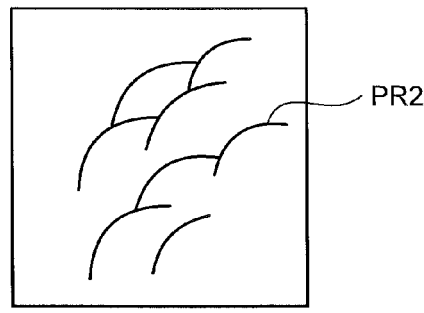
FIG. 17B is a schematic diagram illustrating linear regions corresponding to abnormal villi.
Figure 17C:
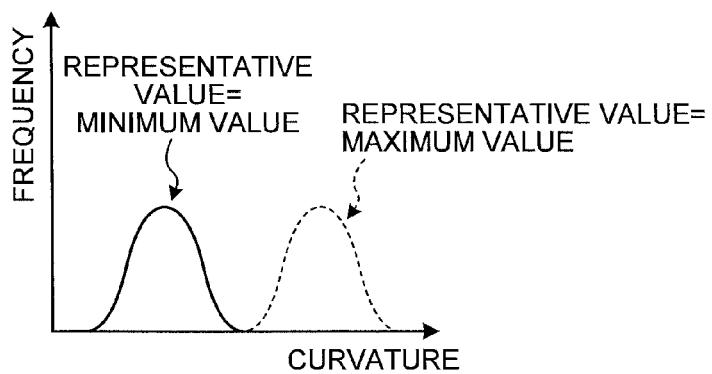
FIG. 17C is a graph illustrating a distribution of curvatures of arcs along the linear regions corresponding to abnormal villi.

FIG. 17A is a schematic diagram illustrating an abnormal villus model. A planar shape of an abnormal villus viewed in a direction of the normal to the mucosal surface forms a flat shape like an ellipse. Thus, in the intraluminal image, a contour portion according to the orientation of the villus with respect to an imaging direction (a contour portion with a high curvature or a contour portion with a low curvature) has a high luminance. Therefore, when convex regions are extracted from an intraluminal image where abnormal villi are displayed, as illustrated in FIG. 17B, linear regions PR2 that form arc shapes having curvatures according to the imaging direction are obtained. Hence, a distribution of the curvatures of arcs along the linear regions PR2 falls within a somewhat narrow range, as illustrated in FIG. 17C. In addition, when a minimum value of the curvature is adopted as a representative value of the curvature of an arc along each linear region PR2, the curvatures are distributed leaning toward the small value side (see a solid line). On the other hand, when a maximum value of the curvature is adopted as a representative value of the curvature, the curvatures are distributed leaning toward the large value side (see a dashed line).

Figure 18A:
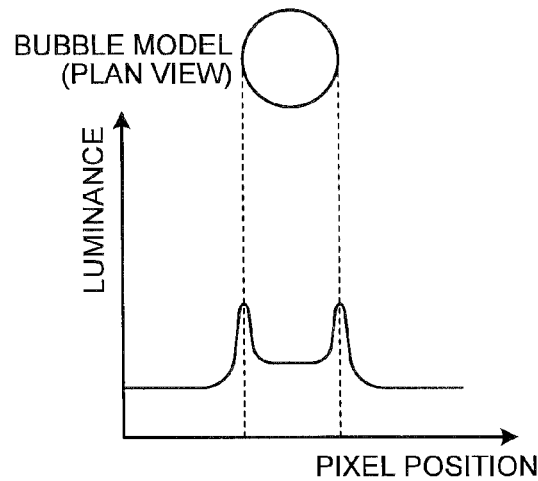
FIG. 18A is a schematic diagram illustrating a bubble model.
Figure 18B:
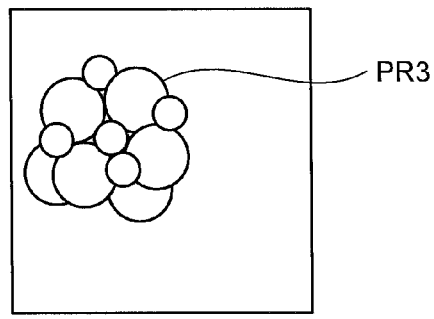
FIG. 18B is a schematic diagram illustrating linear regions corresponding to a bubble region.
Figure 18C:
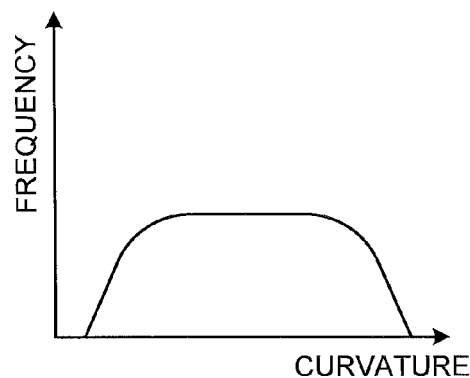
FIG. 18C is a graph illustrating a distribution of curvatures of arcs along the linear regions corresponding to a bubble region.

FIG. 18A is a schematic diagram illustrating a bubble model. In a bubble region, each individual bubble forms a substantially spherical shape. In addition, since the entire bubble surface is a high reflective region, in the intraluminal image a bubble contour portion has a high luminance. Therefore, when convex regions are extracted from an intraluminal image where a bubble region is displayed, as illustrated in FIG. 18B, linear regions PR3 of various sizes that form a substantially circular shape are obtained. Hence, a distribution of the curvatures of arcs along the linear regions PR3 greatly varies, as illustrated in FIG. 18C.

In addition, the curvatures of arcs along mucosal contours generally take small values compared to abnormal villi and bubble regions.

Figure 19:
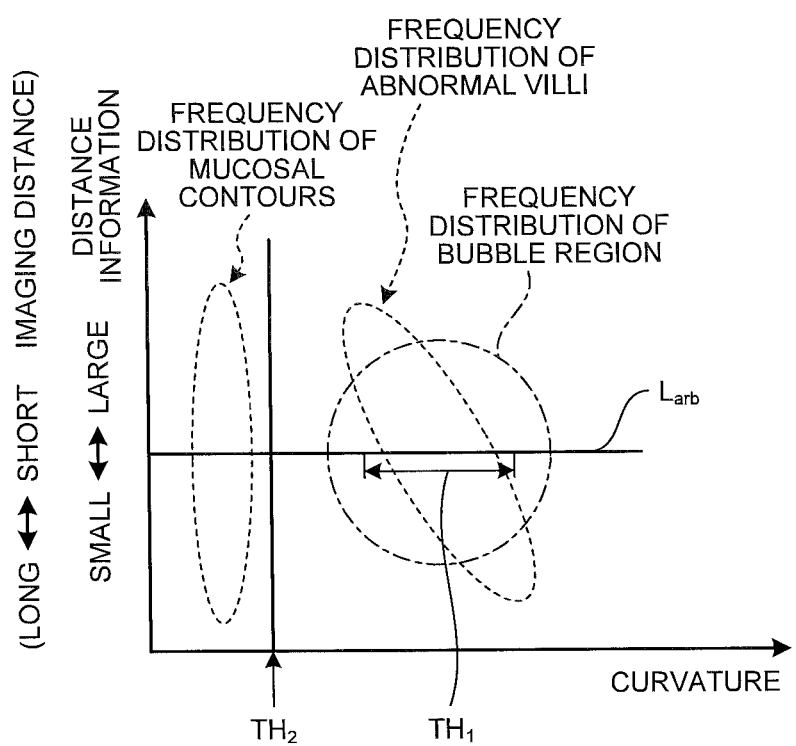
FIG. 19 is a schematic diagram illustrating a frequency distribution consisting of two axes, arc curvature and distance information.

FIG. 19 is a schematic diagram illustrating a frequency distribution consisting of two axes, arc curvature and distance information. The curvatures of arcs along linear regions representing mucosal contours are mostly independent of the imaging distance, and have small values and are distributed in a narrow range. In addition, the curvatures of arcs along linear regions representing a bubble region are independent of the imaging distance and are distributed in a wide range. On the other hand, a distribution range of the curvatures of arcs along linear regions representing abnormal villi changes according to the imaging distance. Specifically, when the imaging distance increases (the value of imaging information decreases), the curvatures are distributed on the large value side (on the steep arc curve side), and when the imaging distance decreases (the value of imaging information increases), the curvatures are distributed on the small value side (on the gentle arc curve side).

Hence, the abnormality determining unit 140 makes a determination as follows.

First, when the variance of curvature for given distance information $L_{arb}$ is greater than a predetermined threshold value (variance threshold value) $TH_1$ which is determined in advance according to the distance information $L_{arb}$, a bubble region is displayed in the region of interest and thus the abnormality determining unit 140 determines that there is no abnormal portion.

In addition, in the case in which the variance of curvature for the distance information $L_{arb}$ is less than or equal to the variance threshold value $TH_1$, when the curvatures are distributed in a range smaller than a predetermined threshold value (curvature threshold value) $TH_2$, mucosal contours are displayed in the region of interest and thus the abnormality determining unit 140 determines that there is no abnormal portion.

On the other hand, in the case in which the variance of curvature for the distance information $L_{arb}$ is less than or equal to the variance threshold value $TH_1$, when the curvatures are distributed in a range greater than or equal to the curvature threshold value $TH_2$, abnormal villi are displayed in the region of interest and thus the abnormality determining unit 140 determines that there is an abnormal portion.

At subsequent step S60, the calculating unit 100 outputs a result of the determination as to whether there is an abnormal portion which is made at step S50. Accordingly, the control unit 10 displays the result of the determination on the display unit 40 and records the result of the determination in the recording unit 50 so as to be associated with the image data of the processing target intraluminal image.

As described above, according to the first embodiment, a mucosal region which is extracted from an intraluminal image is set as a region of interest, and high-frequency components included in convex regions, each of which is composed of a pixel group having higher pixel values than its neighboring pixels, are extracted from the region of interest. Then, as curvature feature data, curvatures and distance information are computed for linear regions obtained by thinning the high-frequency components, and an object displayed in the region of interest is identified based on a frequency distribution of the feature data. Accordingly, erroneous detection (overdetection) of mucosal contours, bubbles, etc., is suppressed, and also changes in the size of microstructures of villi according to the imaging distance and changes in shape according to the orientation of villi with respect to the imaging direction are dealt with, by which abnormal villi are accurately identified, enabling to determine whether there is an abnormal portion.

Modification 1-1

Although, in the above-described first embodiment, the entire remaining region obtained after removing unnecessary regions from an intraluminal image is set as one region of interest, each of a plurality of regions into which the remaining region is divided may be set as a region of interest. In this case, it becomes possible to identify at which location in the intraluminal image an abnormal portion is present. A division method is not particularly limited, and for example, a remaining region obtained after removing unnecessary regions may be simply divided into a matrix pattern. Alternatively, distance information corresponding to an imaging distance may be acquired from the pixel value of each pixel in a remaining region obtained after removing unnecessary regions, and the region may be divided on a hierarchy-by-hierarchy basis, the distance information being divided into hierarchies. In this case, the process at step S4014 illustrated in FIG. 12 can be omitted.

Modification 1-2

Next, a modification 1-2 of the first embodiment will be described.

Figure 20:
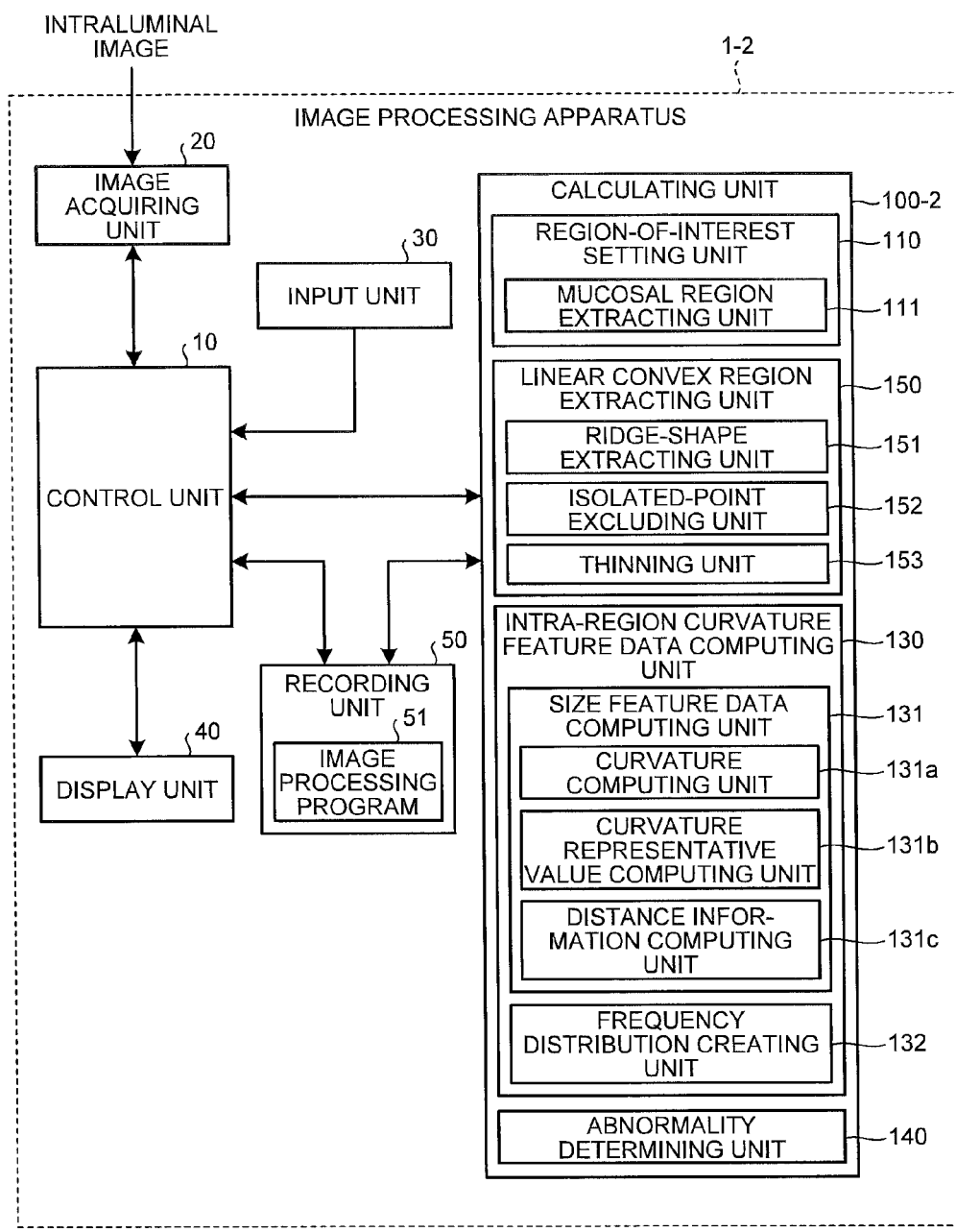
FIG. 20 is a block diagram illustrating an image processing apparatus according to a modification 1-2 of the first embodiment.

FIG. 20 is a block diagram illustrating an image processing apparatus according to the modification 1-2. As illustrated in FIG. 20, an image processing apparatus 1-2 of the modification 1-2 includes a calculating unit 100-2 instead of the calculating unit 100 illustrated in FIG. 1.

The calculating unit 100-2 includes a linear convex region extracting unit 150 instead of the linear convex region extracting unit 120 illustrated in FIG. 1. The linear convex region extracting unit 150 includes a ridge-shape extracting unit 151 that extracts, as a ridge-shaped region, a pixel group whose pixel values change in a ridge-shaped manner; an isolated-point excluding unit 152 that excludes, as an isolated point, a pixel group that is isolated from its neighboring pixels, from the extracted ridge-shaped region; and a thinning unit 153 that thins the ridge-shaped region obtained after excluding the isolate points, and extracts a linear convex region.

Figure 21:
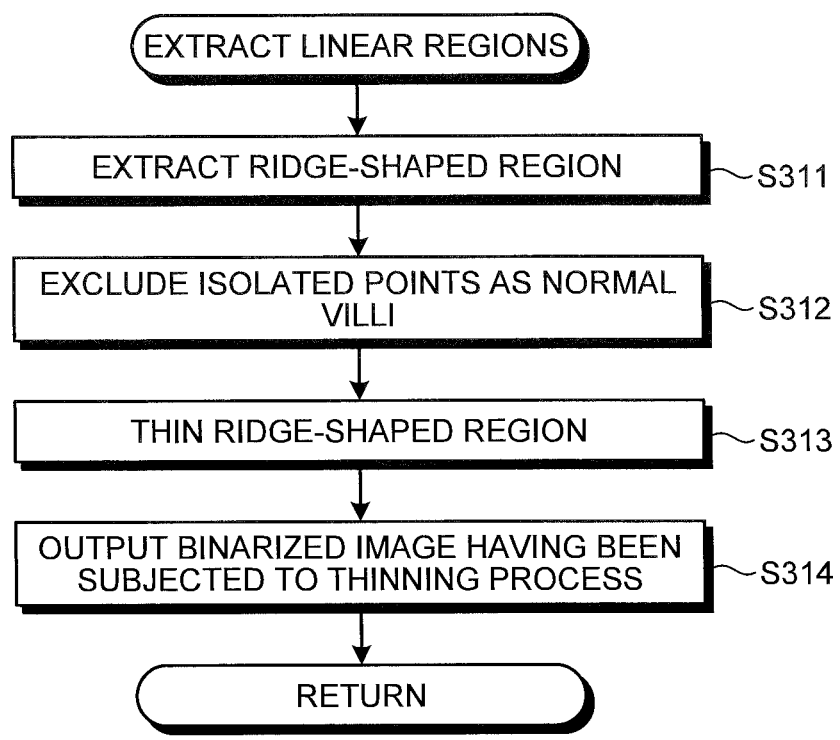
FIG. 21 is a flowchart illustrating the details of processes performed by a linear convex region extracting unit illustrated in FIG. 20.

The overall operation of the calculating unit 100-2 is similar to that illustrated in FIG. 2, but only the content of processes performed by the linear convex region extracting unit 150 at step S30 is different. FIG. 21 is a flowchart illustrating the details of processes performed by the linear convex region extracting unit 150.

First, at step S311, the ridge-shape extracting unit 151 extracts a ridge-shaped region from a region of interest. More specifically, the ridge-shape extracting unit 151 sequentially sets pixels of interest in the region of interest, and calculates a maximum direction (hereinafter, referred to as a maximum gradient direction) and a minimum direction (hereinafter, referred to as a minimum gradient direction) of a gradient of a pixel value for each pixel of interest. Then, curvatures of a shape whose pixel values change are computed for each of the maximum gradient direction and the minimum gradient direction, and the ridge-shaped region is detected based on a ratio between these curvatures.

To do so, the ridge-shape extracting unit 151 first solves an eigenvalue equation of a Hessian matrix H shown in the following equation (4) for a pixel of interest, and thereby computes, as eigenvalues, a curvature $k_1$ for the maximum gradient direction and a curvature $k_2$ for the minimum gradient direction.

$$\det(H - \lambda E) = 0 \quad (4)$$

In equation (4), the Hessian matrix H is given by the following equation (5):

$$H = \begin{bmatrix} \frac{\partial^2 f(x,y)}{\partial x^2} & \frac{\partial^2 f(x,y)}{\partial x \partial y} \\ \frac{\partial^2 f(x,y)}{\partial y \partial x} & \frac{\partial^2 f(x,y)}{\partial y^2} \end{bmatrix} \quad (5)$$

In addition, the symbol E is the identify matrix and λE is as shown in the following equation (6):

$$\lambda E = \begin{bmatrix} k_1 & 0 \\ 0 & k_2 \end{bmatrix} \quad (6)$$

Subsequently, a Gaussian curvature $\kappa_G$ and a mean curvature $A_k$ which are given by the following equations (7-1) and (7-2) are computed from the curvatures $k_1$ and $k_2$.

$$K_G = k_1 \times k_2 \quad (7\text{-}1)$$

$$A_k = (k_1 + k_2)/2 \quad (7\text{-}2)$$

At this time, a pixel group where $A_k < 0$ and $K_G \approx 0$, i.e., a pixel group where the absolute value $|K_G|$ is less than or equal to a predetermined threshold value, is determined to be a ridge-shaped region. The ridge-shape extracting unit 151 assigns the pixel value 1 to the pixel group determined to be a ridge-shaped region, and assigns the pixel value 0 to other pixels, and thereby creates a binarized image.

Note that after computing the curvatures $k_1$ and $k_2$, a ridge-shaped region may be determined using any publicly known technique that recognizes arbitrary three-dimensional surface shapes like, for example, shape index and curvedness (reference: Chitra Dorai, Anil K. Jain, "COSMOS—A Representation Scheme for Free-Form Surfaces").

At subsequent step S312, the isolated-point excluding unit 152 extracts isolated points from the ridge-shaped region which is extracted at step S311, and excludes the isolated points as normal villi. More specifically, a pixel group where the number of continuously-arranged pixels is less than or equal to a predetermined value (i.e., a region of a size less than or equal to a predetermined value) is extracted as an isolated point from the binarized image created at step S311. Then, the pixel value 0 is assigned to the pixel group extracted as an isolated point.

At subsequent step S313, the thinning unit 153 thins the ridge-shaped region obtained after excluding the isolated points. More specifically, the thinning unit 153 performs a thinning filtering process using the patterns M1 to M8 illustrated in FIG. 10, on the binarized image created at step S312. Note that the detailed content of the thinning filtering process is the same as that of the first embodiment.

Furthermore, at step S314, the linear convex region extracting unit 150 outputs the binarized image having been subjected to the thinning process. Thereafter, processing returns to the main routine.

Modification 1-3

In the first embodiment, for the process of thinning a convex-shaped high-frequency region which is extracted from a region of interest (see step S303 in FIG. 8), various publicly known techniques can be applied in addition to the above-described method. A Hilditch thinning algorithm which is one of the publicly known techniques will be described below.

First, as a first step, in a binarized image from which a convex-shaped high-frequency region has been extracted, pixels that satisfy six conditions shown below are deleted sequentially as boundary pixels, among pixels $P_k$ which are target pixels for thinning. Here, k is the pixel number of a pixel in the binarized image (k is a natural number). In addition, the pixel value of the pixel $P_k$ is represented by $B(P_k)$ ($B(P_k)=1$). In this case, the first step corresponds to a process of replacing the pixel value $B(P_k)$ from 1 to −1. Note that the pixel value of a non-target pixel for thinning is $B(P_k)=0$.

Condition 1: A pixel of interest is a target pixel for thinning. That is, the following equation (a1) is satisfied.

$$B(P_k) = 1 \quad (a1)$$

Condition 2: A pixel value of any one of pixels that are adjacent to the pixel of interest in vertical and horizontal directions is 0. That is, the following equation (a2) is satisfied.

$$\sum_{k=1}^{4} (1 - |B(P_{2k-1})|) \geq 1 \quad (a2)$$

Condition 3: Not an end point. That is, the following equation (a3) is satisfied.

$$\sum_{k=1}^{8} |B(P_k)| \geq 2 \quad (a3)$$

Condition 4: Not an isolated point. That is, the following equation (a4) is satisfied. Here, a result obtained by a sequential process is represented by $B(P_k)$ and a result obtained when an immediately previous raster operation is completed is represented by $B'(P_k)$, by which the results are distinguished from each other. Note that the pixel value $B'(P_k)$ does not take −1.

$$\sum_{k=1}^{8} B'(P_k) \geq 1 \quad (a4)$$

Condition 5: Connectivity is maintained. That is, any of patterns M11 to M14 illustrated in FIG. 22 is applied. Note that in FIG. 22 the pixel represented by "*" takes the pixel value 1 or −1. This condition is represented by a conditional expression shown in the following equation (a5):

$$\sum_{k=1}^{4} \{1 - |B(P_{2k-1})| - (1 - |B(P_{2k-1})|)(1 - |P(P_{2k})|)(1 - |P(P_{2k+1})|)\} = 1 \quad (a5)$$

Condition 6: For a line segment with a line width of 2, only one of them is deleted. That is, the result $B'(P_k)$ obtained when an immediately previous raster operation is completed applies to any one of patterns M21 to M24 illustrated in FIG. 23. This condition is represented by a conditional expression shown in the following equation (a6):

$$\sum_{k=1}^{4}\{1-B'(P_{2k-1})-(1-B'(P_{2k-1}))(1-B'(P_{2k}))(1-B'(P_{2k+1}))\}=1 \qquad (a6)$$

Next, as a second step, the pixel values of the pixels having been deleted sequentially as boundary pixels (i.e., the pixels whose pixel values $B(P_k)$ have been replaced from 1 to −1) are replaced by the pixel value of a non-target region $B(P_k)=0$.

These first and second steps are repeated until there is no more replacement to the pixel value of a non-target region. By that, thinning of a target region is performed.

Second Embodiment

Next, a second embodiment of the present invention will be described.

Figure 24:
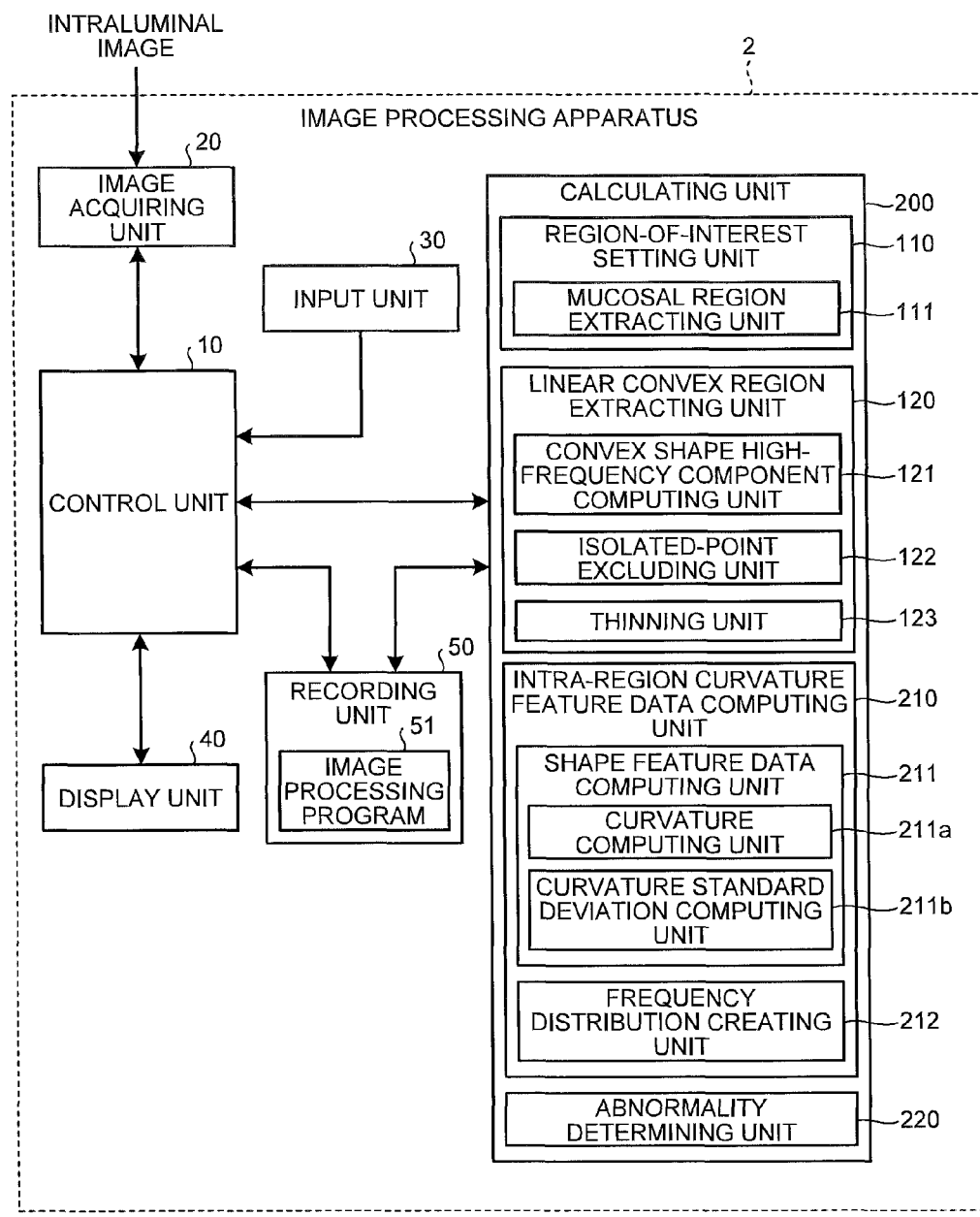
FIG. 24 is a block diagram illustrating a configuration of an image processing apparatus according to a second embodiment of the present invention.

FIG. 24 is a block diagram illustrating a configuration of an image processing apparatus according to the second embodiment. As illustrated in FIG. 24, an image processing apparatus 2 according to the second embodiment includes a calculating unit 200 instead of the calculating unit 100 illustrated in FIG. 1. The calculating unit 200 includes a region-of-interest setting unit 110, a linear convex region extracting unit 120, an intra-region curvature feature data computing unit 210, and an abnormality determining unit 220. Note that the configurations and operation of the region-of-interest setting unit 110 and the linear convex region extracting unit 120 are the same as those of the first embodiment. Note also that the configurations and operation of those units of the image processing apparatus other than the calculating unit 200 are also the same as those of the first embodiment.

The intra-region curvature feature data computing unit 210 includes a shape feature data computing unit 211 that computes the curvatures of one or more arcs along each linear region which is extracted by the linear convex region extracting unit 120, and computes variation in those curvatures as feature data; and a frequency distribution creating unit 212 that creates a frequency distribution of the feature data. More specifically, the shape feature data computing unit 211 includes a curvature computing unit 211a that computes the curvatures of one or more arcs from each section of a linear region that is delimited by endpoints of the linear region and/or intersection points of linear regions; and a curvature standard deviation computing unit 211b that computes a standard deviation of the curvatures of one or more arcs which are computed from each section.

The abnormality determining unit 220 determines whether there is an abnormal portion, based on the variation in the curvatures.

Next, the operation of the image processing apparatus 2 will be described.

The overall operation of the image processing apparatus 2 is similar to that illustrated in FIG. 2, but the contents of processes performed by the intra-region curvature feature data computing unit 210 at step S40 and processes performed by the abnormality determining unit 220 at step S50 are different from those of the first embodiment.

Figure 25:
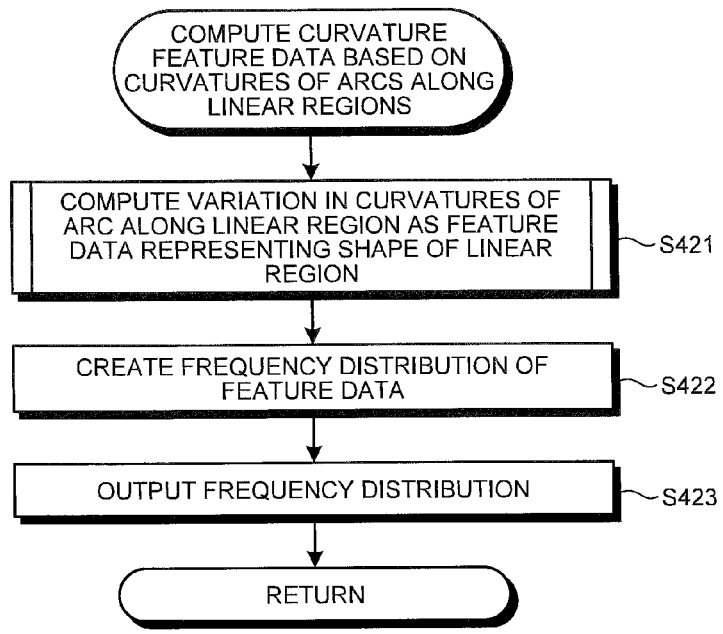
FIG. 25 is a flowchart illustrating processes performed by an intra-region curvature feature data computing unit illustrated in FIG. 24.
Figure 26:
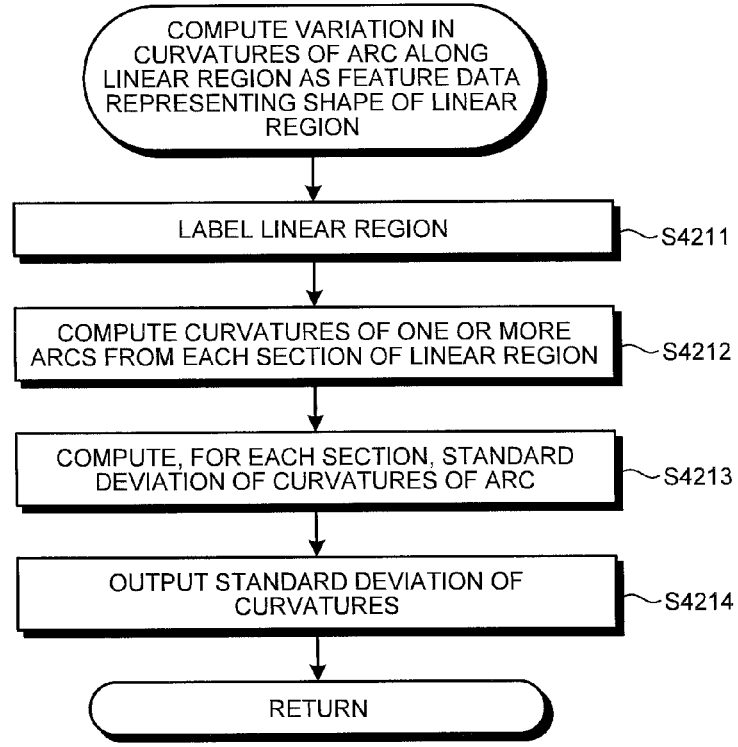
FIG. 26 is a flowchart illustrating processes performed by a shape feature data computing unit illustrated in FIG. 24.

FIG. 25 is a flowchart illustrating processes performed by the intra-region curvature feature data computing unit 210. First, at step S421, the shape feature data computing unit 211 computes, as feature data representing a shape of a linear region which is extracted at step S30, a variation in the curvatures of an arc along the linear region. The processes performed by the shape feature data computing unit 211 will be described in detail with reference to FIG. 26. Note that steps S4211 and S4212 illustrated in FIG. 26 correspond to steps S4011 and S4012 illustrated in FIG. 12, respectively. The process at step S4212 is performed by the curvature computing unit 211a instead of the curvature computing unit 131a (see FIG. 1).

At step S4213 subsequent to step S4212, the curvature standard deviation computing unit 211b computes, for each section of the linear region, a standard deviation of the curvatures of one or more arcs. Specifically, the curvature standard deviation computing unit 211b computes a standard deviation σ which is given by the following equation (8), from m curvatures $\kappa_i$ (i=1 to m) which are computed for an arc having the same label number assigned by the curvature computing unit 211a.

$$\sigma = \sqrt{\frac{1}{m}\sum_{i=1}^{m}(\kappa_i - \overline{\kappa})^2} \qquad (8)$$

In equation (8), the κ bar where a bar is provided above κ is the mean value of the curvature $\kappa_i$, and is given by the following equation (9):

$$\overline{\kappa} = \frac{1}{m}\sum_{i=1}^{m}\kappa_i \qquad (9)$$

At subsequent step S4214, the shape feature data computing unit 211 outputs the standard deviation computed for each section of the linear region, as feature data representing the shape of the linear region. Thereafter, processing returns to the main routine.

At step S422 subsequent to step S421, the frequency distribution creating unit 212 creates, as a frequency distribution of the feature data, a frequency distribution of the standard deviations outputted from the shape feature data computing unit 211.

Furthermore, at step S423, the intra-region curvature feature data computing unit 210 outputs the frequency distribution of the standard deviations as curvature feature data. Thereafter, processing returns to the main routine.

Next, processes performed by the abnormality determining unit 220 will be described.

The abnormality determining unit 220 determines whether there is an abnormal portion in a region of interest, based on the frequency distribution of standard deviations which is curvature feature data.

Figure 27A:
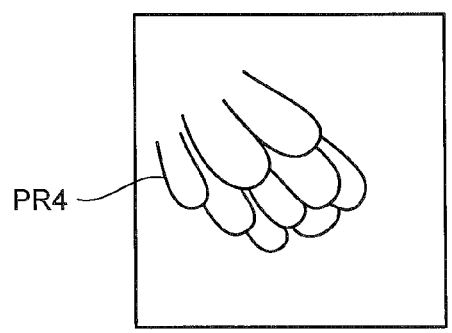
FIG. 27A is a schematic diagram illustrating an abnormal villus model.
Figure 27B:
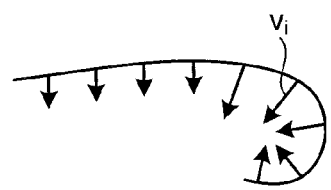
FIG. 27B is a schematic diagram illustrating the curvatures of an arc along a linear region corresponding to an abnormal villus.
Figure 27C:
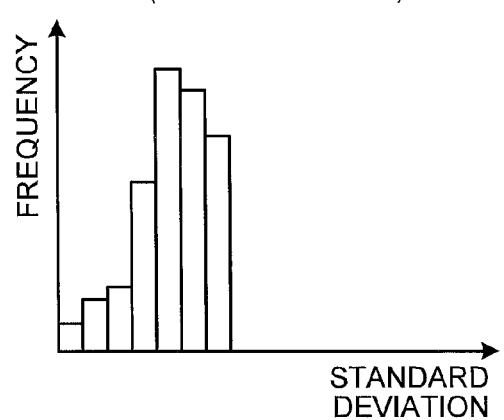
FIG. 27C is a graph illustrating standard deviations of curvatures computed for linear regions corresponding to abnormal villi.

Here, when there are abnormal villi in the region of interest, as illustrated in FIG. 27A, flat linear regions PR4 appear in a linear image created from the region of interest. As illustrated in FIG. 27B, the curvatures of an arc along such a linear region PR4 take various values according to the position in the linear region PR4. Hence, variation in the curvatures is relatively large. Note that a vector $V_i$ (i=1, 2, ...) illustrated in FIG. 27B is a vector representing the magnitude of the curvature of the arc. Therefore, as illustrated in FIG. 27C, the standard deviations of curvatures computed for the linear regions PR4 are distributed in a relatively large-value range.

Figure 28A:
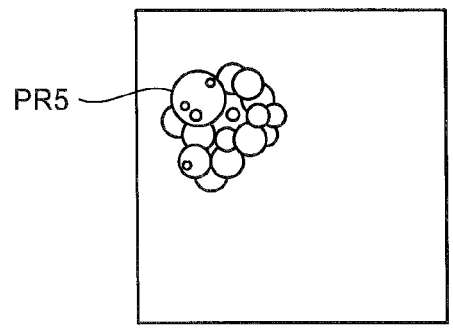
FIG. 28A is a schematic diagram illustrating a bubble model.
Figure 28B:
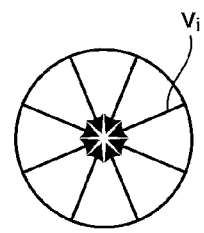
FIG. 28B is a schematic diagram illustrating curvatures of arcs along a linear region corresponding to a bubble region.
Figure 28C:
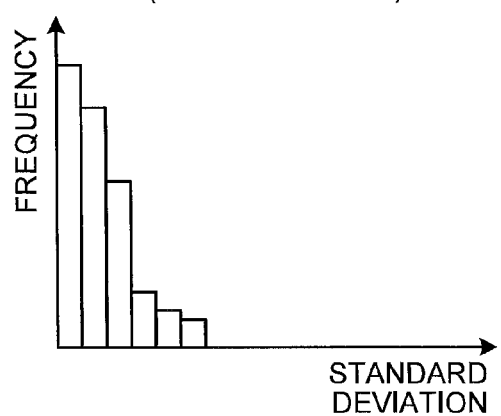
FIG. 28C is a graph illustrating the standard deviations of curvatures computed for linear regions corresponding to a bubble region.

On the other hand, when there is a bubble region in the region of interest, as illustrated in FIG. 28A, circular linear regions PR5 appear in a linear image created from the region of interest. As illustrated in FIG. 28B, in such a linear region PR5, the curvatures of arcs have a substantially uniform value and thus variation in the curvatures is small. Therefore, as illustrated in FIG. 28C, the standard deviations of curvatures computed for the linear regions PR5 are distributed in a small-value range (0 or near 0).

Hence, the abnormality determining unit 220 determines whether there is an abnormal portion, based on the frequency distribution of standard deviations. Specifically, when the frequency distribution of standard deviations leans toward a range greater than a predetermined threshold value, it is determined that there is an abnormal portion in the region of interest.

As described above, according to the second embodiment, a mucosal region which is extracted from an intraluminal image is set as a region of interest, and high-frequency components included in convex regions, each of which is composed of a pixel group having higher pixel values than its neighboring pixels, are extracted from the region of interest. Then, for linear regions obtained by thinning the high-frequency components, a frequency distribution of standard deviations of curvatures of arcs along the linear regions is computed, and it is determined whether there is an abnormal portion in the region of interest, based on the frequency distribution of standard deviations. Accordingly, abnormal villi and bubble regions are accurately identified, enabling to improve the accuracy of determination of an abnormal portion.

In addition, according to the second embodiment, since a determination is made without using an imaging distance (distance information) to an object in the region of interest, a calculation process can be simplified.

Third Embodiment

Next, a third embodiment of the present invention will be described.

Figure 29:
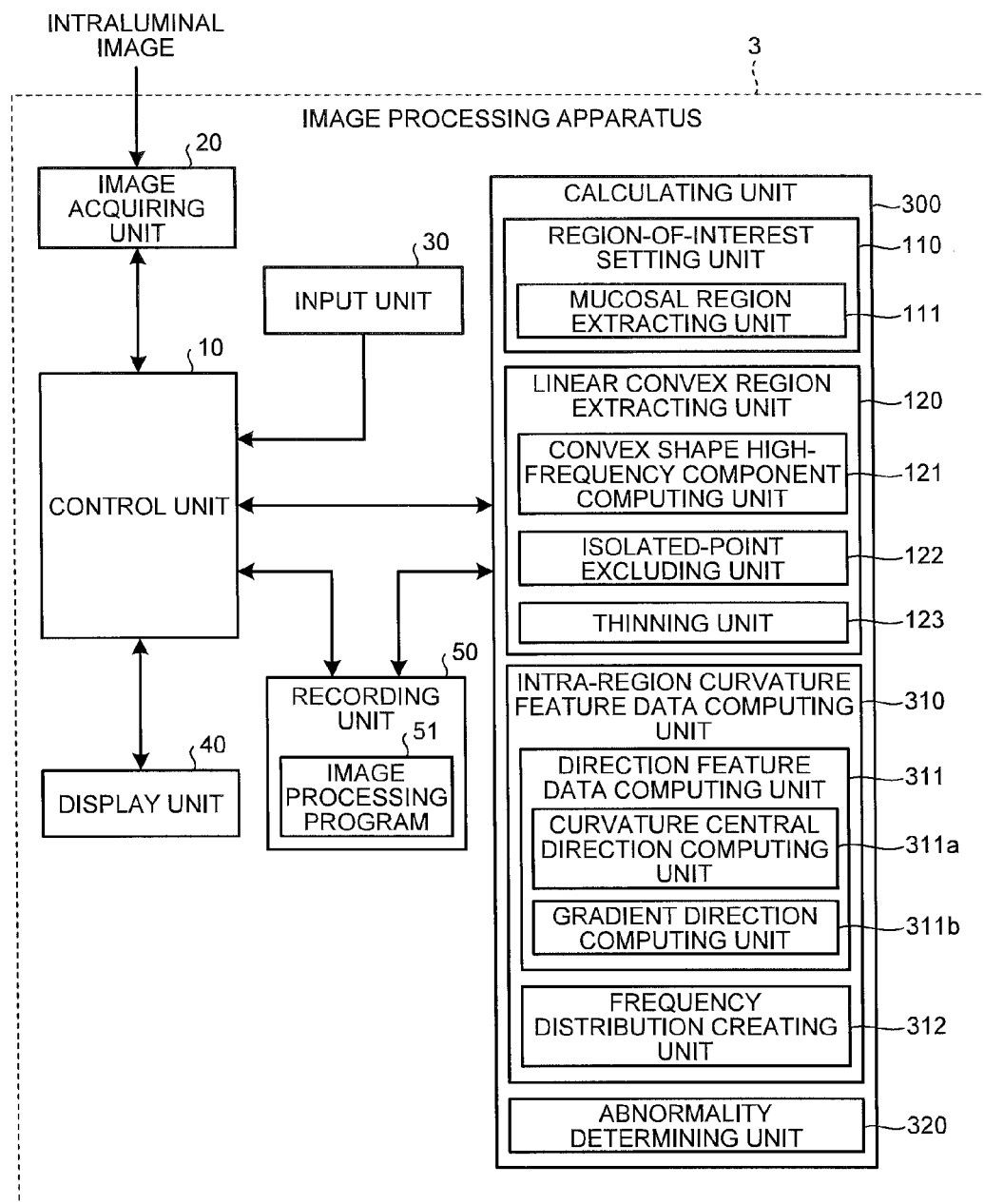
FIG. 29 is a block diagram illustrating a configuration of an image processing apparatus according to a third embodiment of the present invention.

FIG. 29 is a block diagram illustrating a configuration of an image processing apparatus according to the third embodiment. As illustrated in FIG. 29, an image processing apparatus 3 according to the third embodiment includes a calculating unit 300 instead of the calculating unit 100 illustrated in FIG. 1. The calculating unit 300 includes a region-of-interest setting unit 110, a linear convex region extracting unit 120, an intra-region curvature feature data computing unit 310, and an abnormality determining unit 320. Note that the configurations and operation of the region-of-interest setting unit 110 and the linear convex region extracting unit 120 are the same as those of the first embodiment. Note also that the configurations and operation of those units of the image processing apparatus 3 other than the calculating unit 300 are also the same as those of the first embodiment.

The intra-region curvature feature data computing unit 310 includes a direction feature data computing unit 311 that computes curvature feature data representing the central directions of one or more arcs along each linear region which is extracted by the linear convex region extracting unit 120; and a frequency distribution creating unit 312 that creates a frequency distribution of the curvature feature data. Of them, the direction feature data computing unit 311 includes a curvature central direction computing unit 311a that computes a direction going toward a curvature center from each arc (hereinafter, referred to as a curvature central direction); and a gradient direction computing unit 311b that computes a gradient direction of an object for the position of each arc. Here, the gradient direction of an object indicates a direction in which the object (specifically, a mucosal structure) is inclined in a depth direction of an image.

The abnormality determining unit 320 determines whether there is an abnormal portion, based on the gradient direction of the mucosal structure and the distribution of the curvature central directions.

Next, the operation of the image processing apparatus 3 will be described.

The overall operation of the image processing apparatus 3 is similar to that illustrated in FIG. 2, but the contents of processes performed by the intra-region curvature feature data computing unit 310 at step S40 and processes performed by the abnormality determining unit 320 at step S50 are different from those of the first embodiment.

Figure 30:
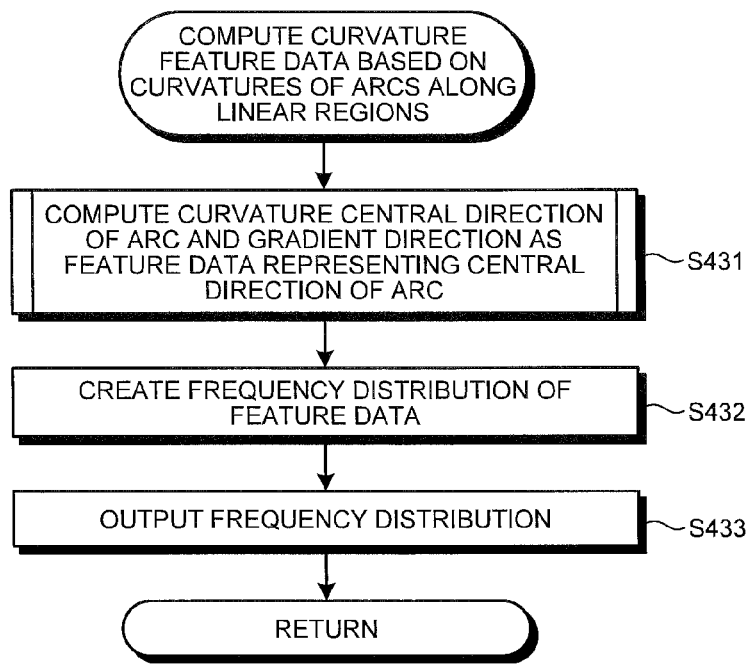
FIG. 30 is a flowchart illustrating processes performed by an intra-region curvature feature data computing unit illustrated in FIG. 29.
Figure 31:
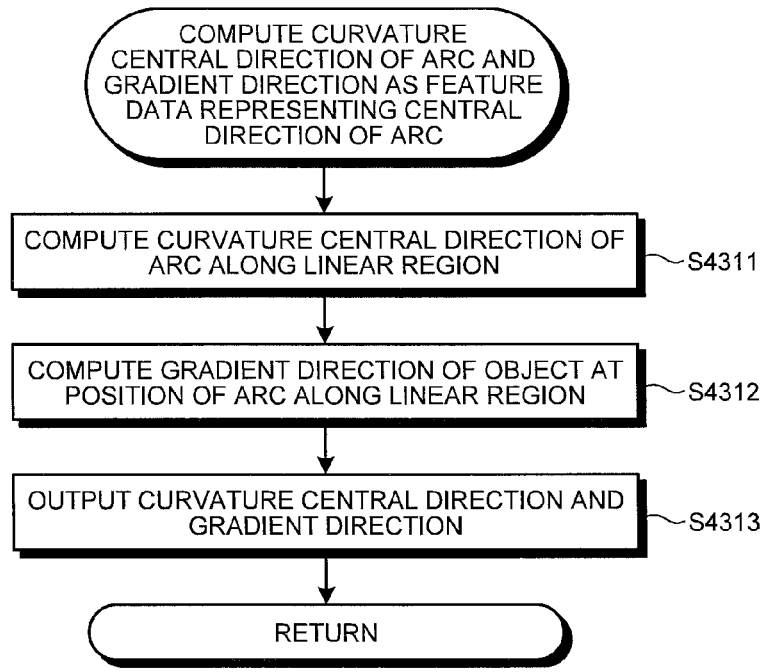
FIG. 31 is a flowchart illustrating processes performed by a direction feature data computing unit illustrated in FIG. 29.

FIG. 30 is a flowchart illustrating processes performed by the intra-region curvature feature data computing unit 310. First, at step S431, the direction feature data computing unit 311 computes, as feature data representing a central direction of an arc, a curvature central direction of the arc and a gradient direction. The processes performed by the direction feature data computing unit 311 will be described in detail with reference to FIG. 31.

At step S4311, the curvature central direction computing unit 311a computes a curvature central direction of an arc along a linear region. Specifically, first, in the same manner as step S4012 illustrated in FIG. 12, the curvatures of each arc are computed, and furthermore, curvature radii R which are the reciprocal of the curvatures are computed.

Subsequently, the curvature central direction computing unit 311a performs the Hough transform using position coordinates (x, y) on the arc and the curvature radii R to create an approximate circle (reference: Computer Graphic Arts Society, "Digital Image Processing", pp. 213-214). Here, the approximate circle obtained by the Hough transform can be created by voting a circle with a radius R passing through the position coordinates (x, y) on the arc into a parameter space consisting of the central coordinate (a, b) of the circle and the radius R, and by checking results of the voting.

Furthermore, the curvature central direction computing unit 311a computes a direction vector going toward the center of the approximate circle from an arbitrary point (e.g., a central point) on the arc, and outputs the direction vector as a curvature central direction.

At subsequent step S4312, the gradient direction computing unit 311b computes a gradient direction of an object at the position of the arc along the linear region. Specifically, the gradient direction computing unit 311b acquires, from a portion of an original intraluminal image corresponding to a region of interest as a processing target, R component values that have low hemoglobin absorption among the pixel values of the pixels and are closest to the shape of a mucosal surface layer, and creates an R-component image.

Note that at this step S4312, a gradient direction may be acquired from an image created by other techniques, provided that the image has only a small influence on the microstructures of villi on the mucosa. For example, an image obtained by performing an opening process by grayscale morphology which is described in the process of the convex shape high-frequency component computing unit 121 may be used.

Subsequently, the gradient direction computing unit 311b computes, from the R-component image, a gradient direction for the position of the arc whose curvature central direction is computed by the curvature central direction computing unit 311a. Specifically, a first derivative filter process (a Prewitt filter, a Sobel filter, etc.) which is a filtering process for computing edge strength (reference: Computer Graphic Arts Society, "Digital Image Processing", pp. 114-117) is performed.

At step S4313, the direction feature data computing unit 311 outputs the curvature central direction of the arc and the gradient direction as feature data. Thereafter, processing returns to the main routine.

At step S432 subsequent to step S431, the frequency distribution creating unit 312 creates a frequency distribution of the feature data outputted from the direction feature data computing unit 311. Specifically, a frequency distribution of the curvature central directions of the arcs is created for each arc gradient direction.

At step S433, the intra-region curvature feature data computing unit 310 outputs the frequency distribution of the curvature central directions of the arcs as curvature feature data.

Next, processes performed by the abnormality determining unit 320 will be described.

The abnormality determining unit 320 determines whether there is an abnormal portion in the region of interest, based on the frequency distribution of curvature central directions which is curvature feature data.

Figure 32A:
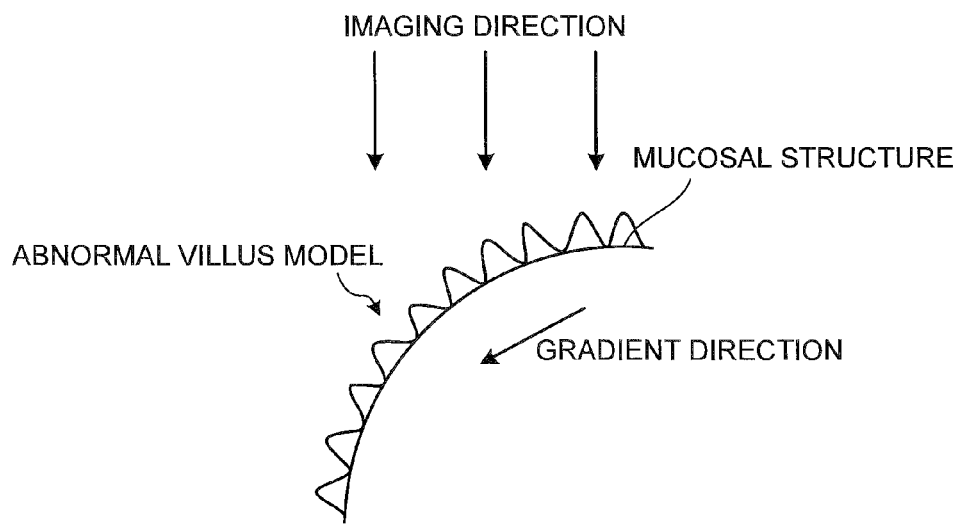
FIG. 32A is a schematic diagram illustrating an abnormal villus model.
Figure 32B:
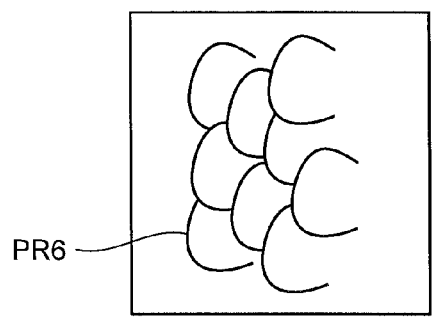
FIG. 32B is a schematic diagram illustrating linear regions corresponding to abnormal villi.
Figure 32C:
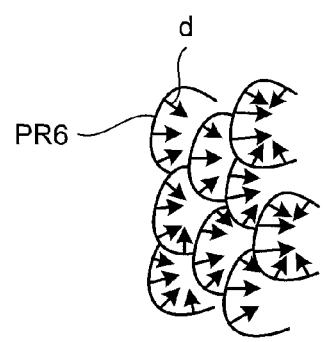
FIG. 32C is a schematic diagram illustrating the curvature central directions of arcs along the linear regions corresponding to abnormal villi.
Figure 32D:
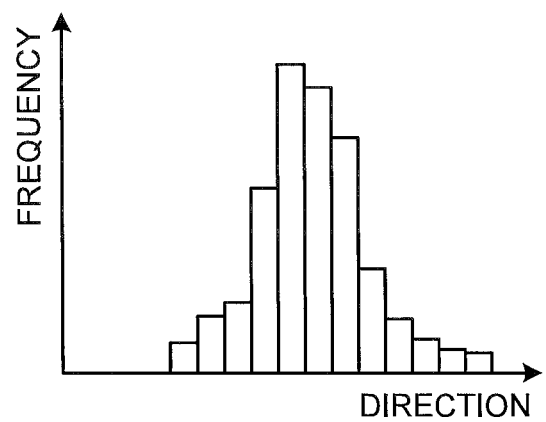
FIG. 32D is a graph illustrating the frequency of curvature central directions for abnormal villi for each gradient direction.

Here, if there are abnormal villi in the region of interest and when imaging is performed on the inclination of an object (mucosal structure) in one imaging direction as illustrated in FIG. 32A, a linear image in which linear regions PR6 face substantially in one direction is obtained as illustrated in FIG. 32B. In this case, as illustrated in FIG. 32C, curvature central directions d face in a nearly uniform direction. Therefore, as illustrated in FIG. 32D, bias occurs in a distribution of curvature central directions for each gradient direction.

Figure 33A:
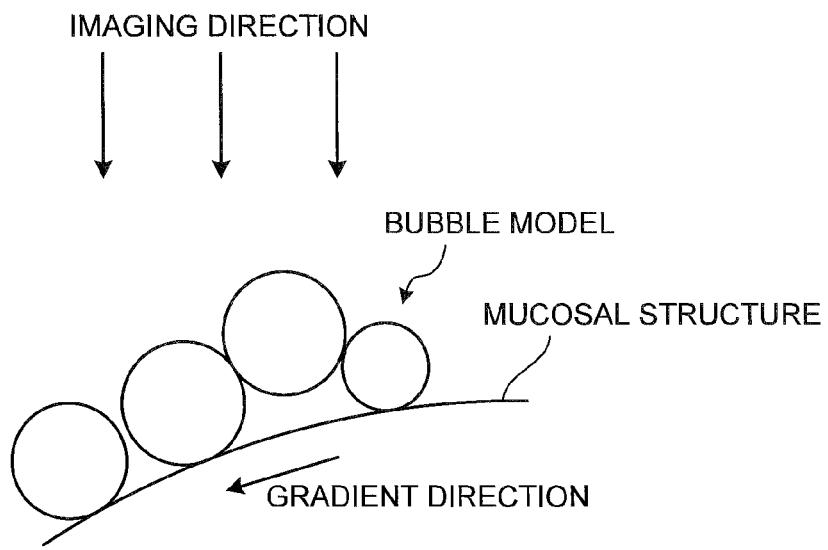
FIG. 33A is a schematic diagram illustrating a bubble model.
Figure 33B:
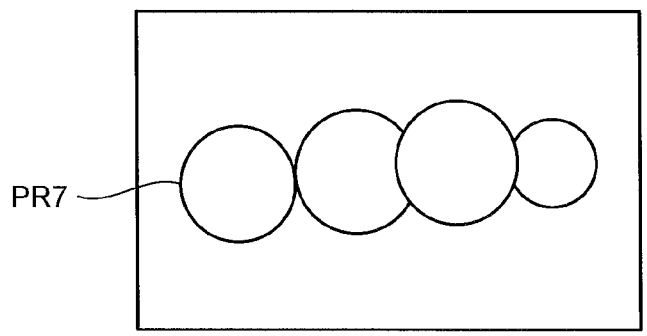
FIG. 33B is a schematic diagram illustrating linear regions corresponding to a bubble region.
Figure 33C:
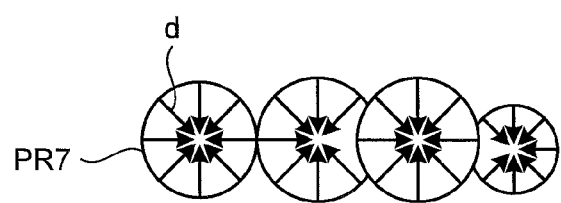
FIG. 33C is a schematic diagram illustrating the curvature central directions of arcs along the linear regions corresponding to a bubble region.
Figure 33D:
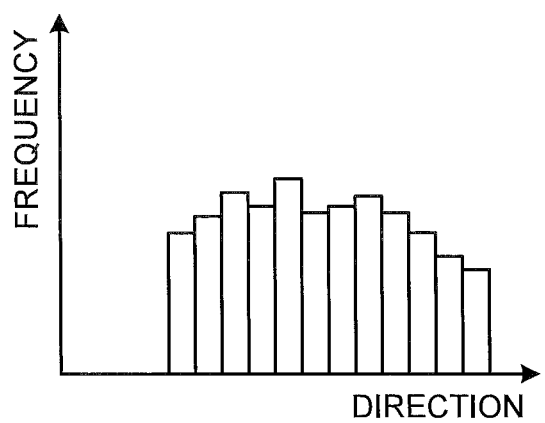
FIG. 33D is a graph illustrating the frequency of curvature central directions for a bubble region for each gradient direction.

On the other hand, if there is a bubble region in the region of interest and when imaging is performed on the inclination of an object (mucosal structure) in one imaging direction as illustrated in FIG. 33A, a linear image is obtained in which linear regions PR7 have a circular shape corresponding to the contour of the bubble region, as illustrated in FIG. 33B. In this case, as illustrated in FIG. 33C, curvature central directions d face in all directions. Therefore, as illustrated in FIG. 33D, the curvature central directions for each gradient direction are distributed widely and nearly uniformly.

Hence, when there is a bias in curvature central direction in the frequency distribution of curvature central directions created for each gradient direction, i.e., the variance of curvature central directions is less than or equal to a predetermined threshold value, the abnormality determining unit 320 determines that there is an abnormal portion in the region of interest.

As described above, according to the third embodiment, a mucosal region which is extracted from an intraluminal image is set as a region of interest, and high-frequency components included in convex regions, each of which is composed of a pixel group having higher pixel values than its neighboring pixels, are extracted from the region of interest. Then, for linear regions obtained by thinning the high-frequency components, curvature central directions of arcs along the linear regions and gradient directions are computed, and it is determined whether there is an abnormal portion in the region of interest, based on a frequency distribution of the curvature central directions created for each gradient direction. Accordingly, abnormal villi and bubble regions are accurately identified according to the orientations of villi that change depending on the imaging direction, enabling to improve the accuracy of determination of an abnormal portion.

Fourth Embodiment

Next, a fourth embodiment of the present invention will be described.

Figure 34:
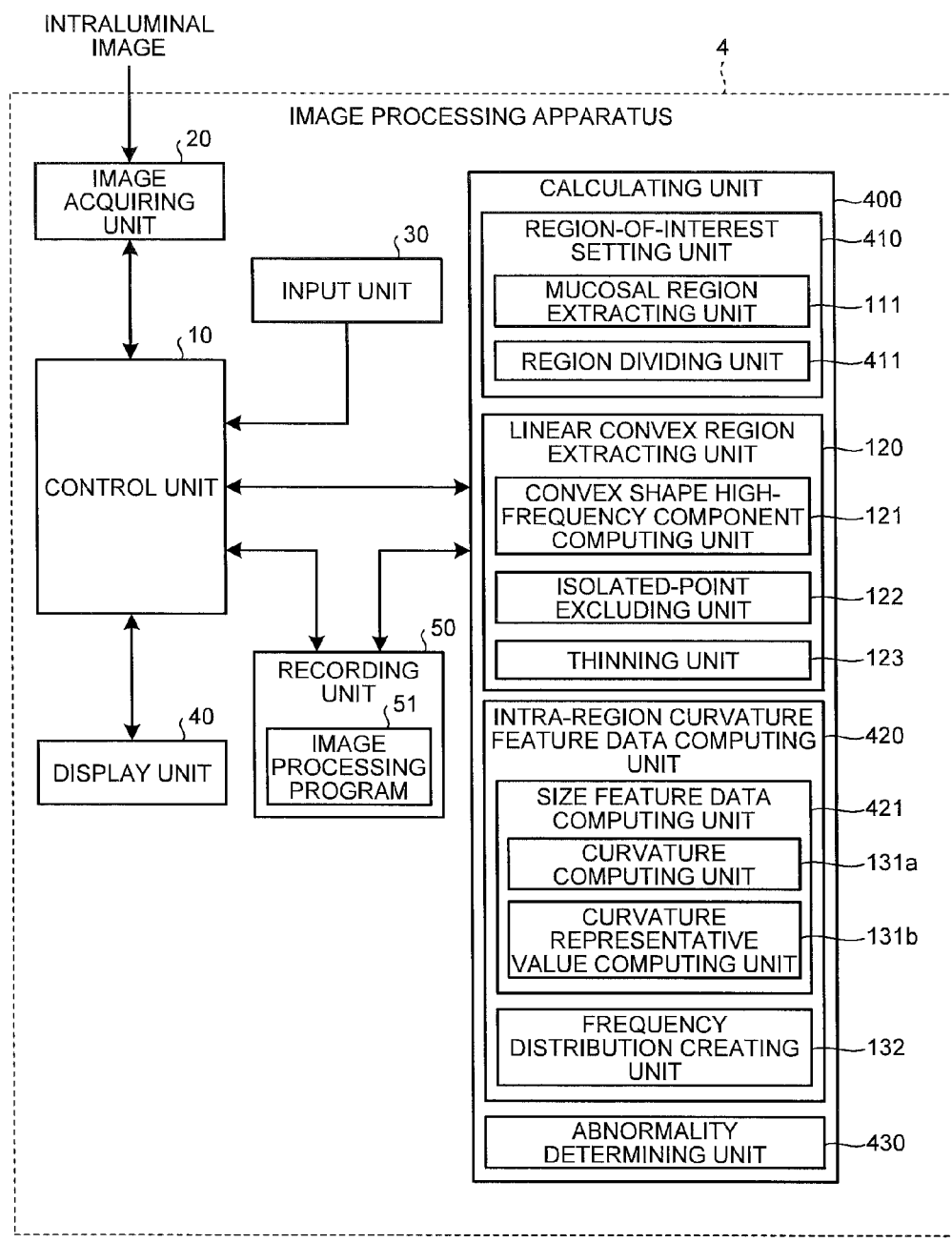
FIG. 34 is a block diagram illustrating a configuration of an image processing apparatus according to a fourth embodiment of the present invention.

FIG. 34 is a block diagram illustrating a configuration of an image processing apparatus according to the fourth embodiment. As illustrated in FIG. 34, an image processing apparatus 4 according to the fourth embodiment includes a calculating unit 400 instead of the calculating unit 100 illustrated in FIG. 1. The calculating unit 400 includes a region-of-interest setting unit 410, a linear convex region extracting unit 120, an intra-region curvature feature data computing unit 420, and an abnormality determining unit 430. Note that the configuration and operation of the linear convex region extracting unit 120 are the same as those of the first embodiment. Note also that the configurations and operation of those units of the image processing apparatus 4 other than the calculating unit 400 are also the same as those of the first embodiment.

The region-of-interest setting unit 410 includes a mucosal region extracting unit 111 that extracts a mucosal region by excluding regions other than mucosa, such as residues and dark portions, from a processing target intraluminal image; and a region dividing unit 411 that further divides the extracted mucosal region into a plurality of regions, and sets each of the divided regions as a region of interest. Note that the operation of the mucosal region extracting unit 111 is the same as that of the first embodiment.

The intra-region curvature feature data computing unit 420 includes a size feature data computing unit 421 including a curvature computing unit 131a and a curvature representative value computing unit 131b; and a frequency distribution creating unit 132. Note that the operation of the curvature computing unit 131a, the curvature representative value computing unit 131b, and the frequency distribution creating unit 132 is the same as that of the first embodiment.

The abnormality determining unit 430 determines whether there is an abnormal portion in each region of interest, based on curvature feature data computed by the intra-region curvature feature data computing unit 420.

Next, the operation of the image processing apparatus 4 will be described.

The overall operation of the image processing apparatus 4 is similar to that illustrated in FIG. 2, but the contents of processes performed at steps S20 to S60 are different from those of the first embodiment.

Figure 35:
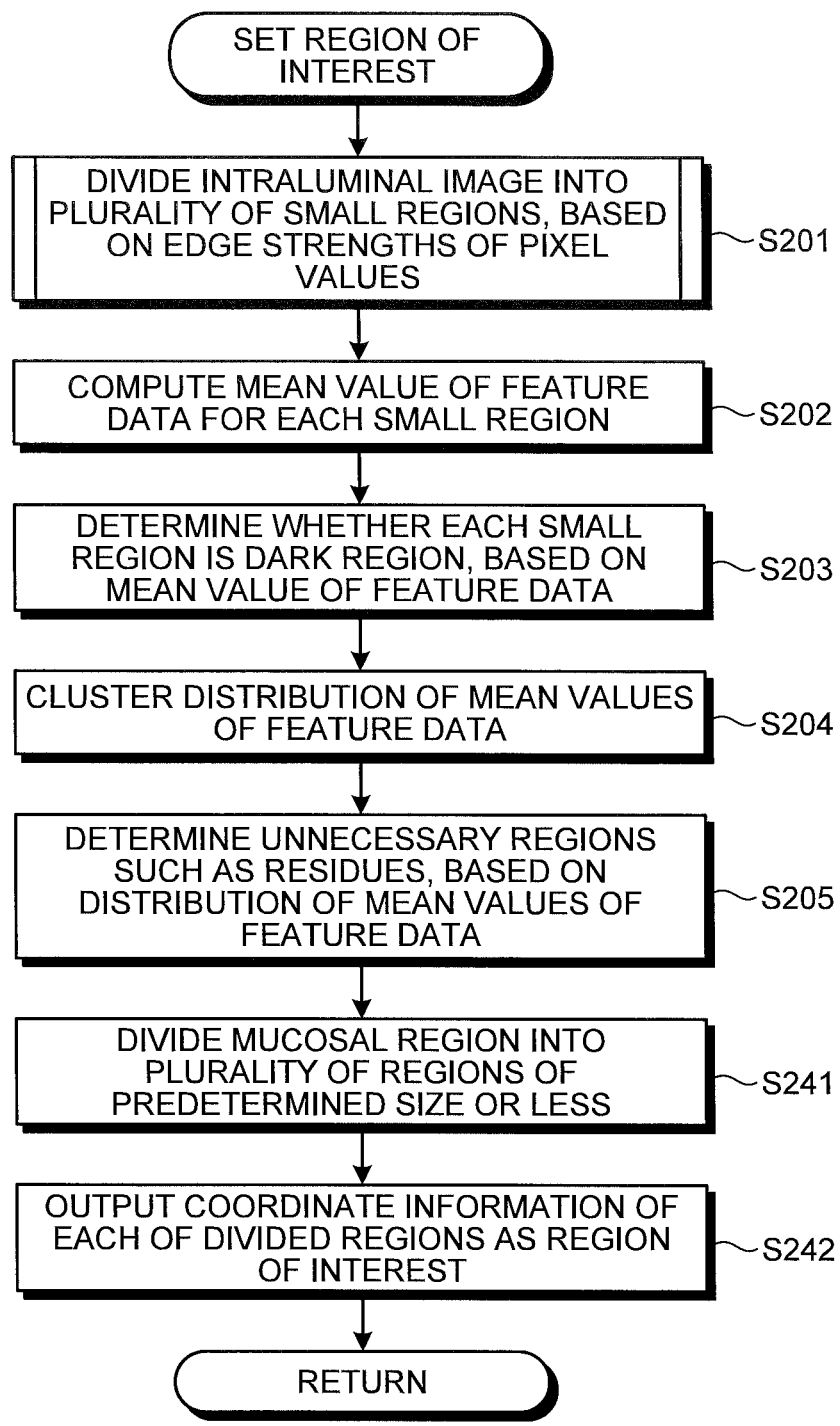
FIG. 35 is a flowchart illustrating processes performed by a region-of-interest setting unit illustrated in FIG. 34.

FIG. 35 is a flowchart illustrating processes performed by the region-of-interest setting unit 410 at step S20. Note that steps S201 to S205 in FIG. 35 correspond to those in FIG. 3.

At step S241 subsequent to step S205, the region-of-interest setting unit 410 divides a mucosal region remaining after removing unnecessary regions, into a plurality of regions, each having a predetermined size or less. A division method is not particularly limited, and in the fourth embodiment the mucosal region is divided into rectangular regions. In addition, the size of one divided region is preset such that the difference in imaging distance to an object in the divided region falls within a predetermined range.

At subsequent step S242, the region-of-interest setting unit 410 outputs coordinate information of each of the divided regions as a region of interest.

At step S30, the linear convex region extracting unit 120 extracts linear regions from each of the regions of interest outputted at step S20.

At step S40, the intra-region curvature feature data computing unit 420 computes, for each region of interest outputted at step S20, curvature feature data based on curvatures of arcs along the linear regions. Note that as the curvature feature data, a frequency distribution of representative values of curvatures of one or more arcs which are computed from each section of the linear regions is computed similarly to the first embodiment, but unlike the first embodiment, the distance information is not computed.

At step S50, the abnormality determining unit 430 determines, for each region of interest, whether there is an abnormal portion in the region of interest, based on the frequency distribution of representative values of curvatures of arcs which is curvature feature data. Specifically, first, when the curvatures are smaller than a predetermined threshold value (curvature threshold value), mucosal contours are displayed in the region of interest and thus it is determined that there is no abnormal portion.

In addition, when the curvatures are greater than the curvature threshold value and the variance of curvature is greater than a predetermined threshold value (variance threshold value), a bubble region is displayed in the region of interest and thus the abnormality determining unit 430 determines that there is no abnormal portion. This is because even if the imaging distance is uniform, a bubble region essentially includes bubbles with various curvatures.

On the other hand, when the curvatures are greater than the curvature threshold value and the variance of curvature is less than or equal to the predetermined threshold value (variance threshold value), abnormal villi are displayed in the region of interest and thus the abnormality determining unit 430 determines that there is an abnormal portion. This is because essentially, abnormal villi in a neighboring region have shapes similar to each other, and thus, when the size of a region of interest is small and the difference in imaging distance in one region of interest can be ignored, the curvatures of arcs corresponding to the contours of abnormal villi match each other.

At step S60, the calculating unit 400 outputs results of the determination made for the respective regions of interest at step S50, together with the coordinate information of the regions of interest. Accordingly, a control unit 10 displays the results of the determination on a display unit 40, and records the results of the determination in a recording unit 50 so as to be associated with image data of the processing target intraluminal image. At this time, the control unit 10 may display a mark or the like that indicates the position of a region of interest having been determined to have an abnormal portion, such that the mark or the like is superimposed on the intraluminal image displayed on the display unit 40.

As described above, according to the fourth embodiment, a plurality of regions of interest are set by dividing a mucosal region extracted from an intraluminal image, and high-frequency components included in convex regions, each of which is composed of a pixel group having higher pixel values than its neighboring pixels, are extracted from each region of interest. Then, for linear regions obtained by thinning the high-frequency components, a frequency distribution of curvatures is computed as curvature feature data, and an object displayed in the region of interest is determined based on the feature data. Accordingly, abnormal villi and bubble regions and mucosal contours are accurately identified, enabling to determine whether there is an abnormal portion.

In addition, according to the fourth embodiment, the mucosal region extracted from the intraluminal image is divided into regions of a size at which the difference in imaging distance to an object can be ignored, and each of the divided regions is set as a region of interest, and then, each process for determining whether there is an abnormal portion is performed. Thus, a distance information computation process and an abnormal portion determination process according to distance information can be omitted, enabling to simplify a calculation process.

In addition, according to the fourth embodiment, since a determination as to whether there is an abnormal portion is made for each region of interest, a region having an abnormal portion in the intraluminal image can be identified.

Modification 4-1

Next, a modification 4-1 of the fourth embodiment will be described.

Figure 36:
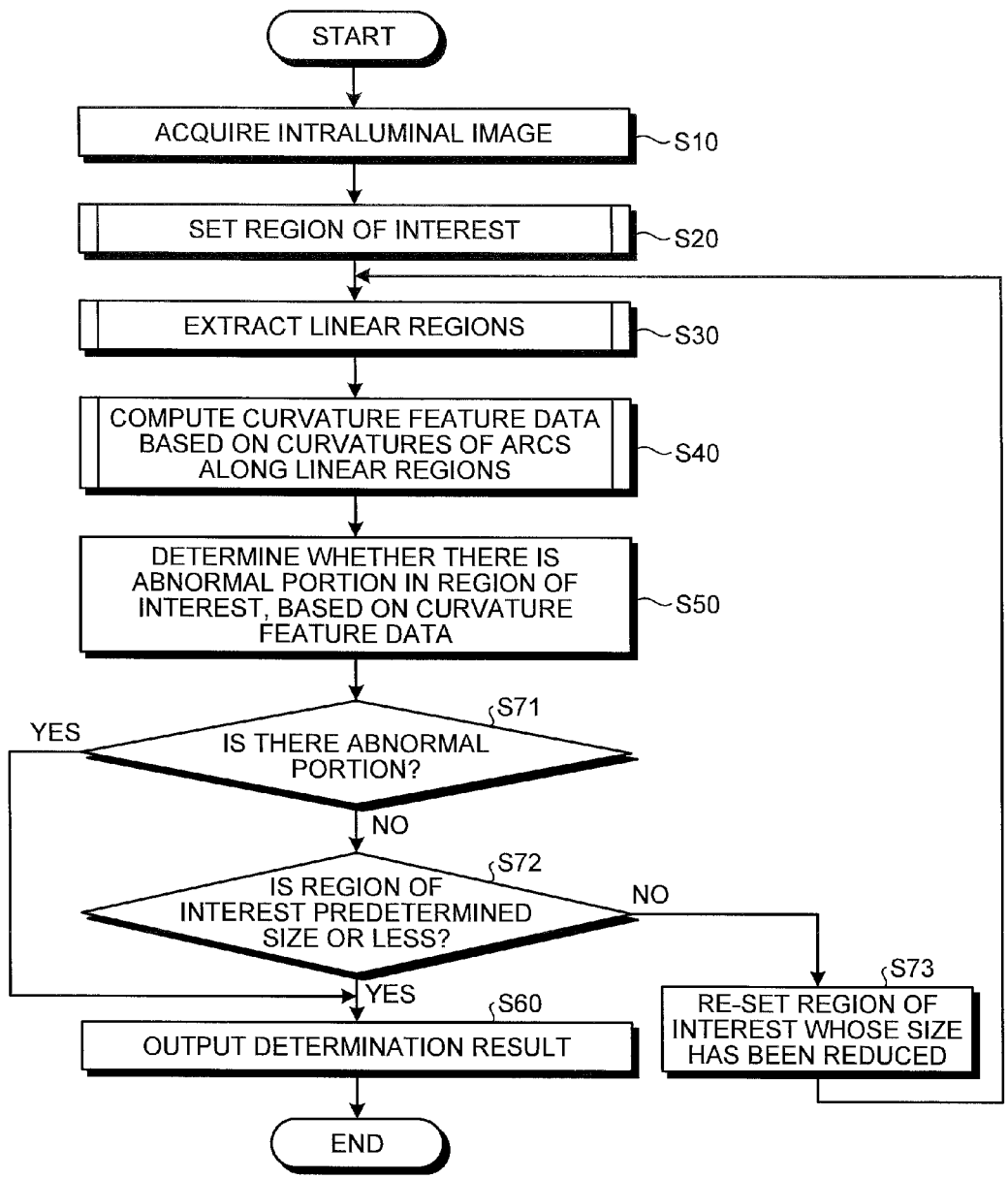
FIG. 36 is a flowchart illustrating the operation of an image processing apparatus of a modification 4-1 of the fourth embodiment.

The size of a region of interest to be set by the region-of-interest setting unit 410 may be variable. The operation of the image processing apparatus 4 performed when the size of a region of interest is variable will be described below. FIG. 36 is a flowchart illustrating the operation of the image processing apparatus 4 of modification 4-1.

At step S20, the region-of-interest setting unit 410 sets a mucosal region remaining after removing unnecessary regions, as one region of interest.

The contents of processes at subsequent steps S30 to S50 are the same as those of the fourth embodiment.

At step S71 subsequent to step S50, the calculating unit 400 determines whether a determination result indicating that there is an abnormal portion in any part of the set region of interest has been obtained. Note that in the first loop of the flowchart, the number of regions of interest is one.

If a determination result indicating that there is an abnormal portion has been obtained (step S71: Yes), processing proceeds to step S60. Note that the content of the process at step S60 is the same as that of the fourth embodiment.

On the other hand, if a determination result indicating that there is an abnormal portion has not been obtained (step S71: No), the calculating unit 400 determines whether the size of the currently set region of interest is less than or equal to a predetermined size (step S72). Note that the predetermined size at this time is set to a size at which the difference in imaging distance to an object in the region of interest can be ignored.

If the size of the region of interest is less than or equal to the predetermined size (step S72: Yes), processing proceeds to step S60.

On the other hand, if the size of the region of interest is greater than the predetermined size (step S72: No), the region-of-interest setting unit 410 reduces the size of the currently set region of interest and re-sets the region of interest in a mucosal region (step S73). Thereafter, processing proceeds to step S30.

As described above, according to this modification 4-1, while the size of a region of interest is gradually reduced, a determination process as to whether there is an abnormal portion is performed for each region of interest. Here, by reducing the size of a region of interest, the difference in imaging distance to an object in each region of interest is reduced. Thus, the accuracy of determination of an abnormal portion for each region of interest increases by repeating the loop of steps S30 to S73. By thus changing the accuracy of determination of an abnormal portion in an intraluminal image from low to high, overlooking of determination of an abnormal portion can be suppressed while an abnormal portion determination process is made efficient.

The image processing apparatuses according to the above-described first to fourth embodiments and modifications thereof can be implemented by executing an image processing program recorded in a recording device, by a computer system such as a personal computer or a workstation. In addition, such a computer system may be used connected to other computer systems or devices such as a server, through a local area network, a wide area network (LAN/WAN), or a public line such as the Internet. In this case, the image processing apparatuses according to the first to fourth embodiments may acquire image data of an intraluminal image through these networks, or output image processing results to various output devices (a viewer, a printer, etc.) which are connected through these networks, or store image processing results in storage devices (e.g., a recording device and a reading device therefor) which are connected through these networks.

According to some embodiments, a linear region having a predetermined number or more of continuously-arranged pixels whose pixel values are higher than those of their neighboring pixels is extracted, curvature feature data based on the curvatures of one or more arcs along the linear region is computed, and it is determined whether there are abnormal villi, based on a distribution of the curvature feature data. With this feature, even if one image includes regions with different imaging distances to an object, it is possible to accurately determine whether there are abnormal villi.

Note that the present invention is not limited to the first to fourth embodiments and the modifications thereof, and various inventions can be formed by appropriately combining together a plurality of components which are disclosed in each embodiment or modification. For example, an invention may be formed by excluding some components from all components shown in each embodiment or modification, or an invention may be formed by appropriately combining together components shown in different embodiments or modifications.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   a region-of-interest setting unit configured to set a region of interest in an image;
   a linear convex region extracting unit configured to extract, from the region of interest, a linear region having a predetermined number or more of continuously-arranged pixels whose pixel values are higher than pixel values of neighboring pixels;
   an intra-region curvature feature data computing unit configured to compute curvature feature data based on curvatures of one or more arcs along the linear region; and
   an abnormality determining unit configured to determine whether there is an abnormal portion in the region of interest, based on a distribution of the curvature feature data.

2. The image processing apparatus according to claim 1, wherein
   the intra-region curvature feature data computing unit comprises a size feature data computing unit configured to compute distance information and the curvatures of one or more arcs, and
   the abnormality determining unit is configured to determine that there is an abnormal portion in the region of interest when the distribution of the curvatures is within a range smaller than a predetermined threshold value, the predetermined threshold value being determined according to the distance information.

3. The image processing apparatus according to claim 2, wherein
   the size feature data computing unit comprises:
   a curvature computing unit configured to compute the curvatures of one or more arcs from each of sections of the linear region, the sections being delimited by endpoints of the linear region and/or intersection points of linear regions;
   a curvature representative value computing unit configured to compute a representative value from the curvatures of one or more arcs; and
   a distance information computing unit configured to compute the distance information from an imaging position of the image to the linear region.

4. The image processing apparatus according to claim 1, wherein
   the intra-region curvature feature data computing unit comprises a shape feature data computing unit configured to compute a variation in the curvatures of one or more arcs, and
   when the variation is greater than a predetermined value, the abnormality determining unit is configured to determine that there is an abnormal portion in the region of interest.

5. The image processing apparatus according to claim 4, wherein
   the shape feature data computing unit comprises:
   a curvature computing unit configured to compute the curvatures of one or more arcs along the linear region from each of sections of the linear region, the sections being delimited by endpoints of the linear region and/or intersection points of linear regions; and
   a curvature standard deviation computing unit configured to compute, for each of the sections, a standard deviation of the curvatures of one or more arcs, wherein
   the abnormality determining unit is configured to make a determination based on the standard deviation.

6. The image processing apparatus according to claim 1, wherein
   the intra-region curvature feature data computing unit comprises a gradient direction feature data computing unit configured to compute directions going toward a curvature center from each of the one or more arcs, and directions in which an object is inclined in a depth direction of the image, at positions of each of the one or more arcs, and
   when a variance of frequency of the directions going toward the curvature center is less than or equal to a predetermined threshold value, the abnormality determining unit is configured to determine that there is an abnormal portion in the region of interest, the variance of frequency being created for each of the directions in which the object is inclined.

7. The image processing apparatus according to claim 1, wherein when it is determined that there is no abnormal portion in the set region of interest, the region-of-interest setting unit is configured to reduce a size of the region of interest to re-set the region of interest.

8. An image processing method comprising:
   setting a region of interest in an image;
   extracting, from the region of interest, a linear region having a predetermined number or more of continuously-arranged pixels whose pixel values are higher than pixel values of neighboring pixels;

computing curvature feature data based on curvatures of one or more arcs along the linear region; and determining whether there is an abnormal portion in the region of interest, based on a distribution of the curvature feature data.

9. A non-transitory computer-readable recording medium with an executable program stored thereon, the program instructing a processor to execute:

setting a region of interest in an image;

extracting, from the region of interest, a linear region having a predetermined number or more of continuously-arranged pixels whose pixel values are higher than pixel values of neighboring pixels;

computing curvature feature data based on curvatures of one or more arcs along the linear region; and determining whether there is an abnormal portion in the region of interest, based on a distribution of the curvature feature data.

* * * * *